United States Patent [19]

Kasuya

[11] Patent Number: 4,697,910
[45] Date of Patent: Oct. 6, 1987

[54] IMAGE PROCESSOR
[75] Inventor: Yukio Kasuya, Tokyo, Japan
[73] Assignee: Canon Kabushiki Kaisha, Tokyo, Japan
[21] Appl. No.: 873,296
[22] Filed: Jun. 9, 1986

Related U.S. Application Data

[63] Continuation of Ser. No. 589,582, Mar. 14, 1984, abandoned.

[30] Foreign Application Priority Data

| Mar. 15, 1983 | [JP] | Japan | 58-42821 |
| Mar. 15, 1983 | [JP] | Japan | 58-42822 |
| Mar. 15, 1983 | [JP] | Japan | 58-42823 |
| Mar. 15, 1983 | [JP] | Japan | 58-42824 |

[51] Int. Cl.$^4$ ............................................. G03G 15/04
[52] U.S. Cl. .................................. 355/3 R; 355/14 R; 355/14 E; 346/160; 358/300
[58] Field of Search ............... 355/3 R, 7, 14 E, 14 R; 346/160; 358/300, 298; 350/332, 346

[56] References Cited

U.S. PATENT DOCUMENTS

| 3,936,172 | 2/1976 | McVeigh | 355/3 R |
| 4,052,715 | 10/1977 | Streifer | 358/300 Y |
| 4,117,472 | 9/1978 | Freer et al. | 350/346 Y |
| 4,176,943 | 12/1979 | Hasebe et al. | 355/14 R |
| 4,297,022 | 10/1981 | Lester | 355/3 R |
| 4,380,387 | 4/1983 | Yajima | 355/3 R |
| 4,386,836 | 7/1983 | Aoki et al. | 355/3 R |
| 4,408,871 | 10/1983 | Kojima | 355/14 R |

FOREIGN PATENT DOCUMENTS

| 54-47648 | 4/1979 | Japan | 355/14 E |
| 57-104952 | 6/1982 | Japan | 355/14 R |

OTHER PUBLICATIONS

*IBM Technical Disclosure Bulletin,* vol. 19, No. 7, Dec. 1976, Clark, W. D., "Copier Printhead".

Primary Examiner—Arthur T. Grimley
Assistant Examiner—J. Pendegrass
Attorney, Agent, or Firm—Fitzpatrick, Cella, Harper & Scinto

[57] ABSTRACT

An image-processing apparatus, can function as a copier and also as a printer, has first and second image-forming units, a switching unit and an output unit. When the first image-forming unit is selected by the switching unit, images are formed on a recording medium by the light from an original to be copied. When the second image-forming unit is selected, images are formed by controlling the transmission of light. The images formed on the recording medium are provided by the output unit.

16 Claims, 51 Drawing Figures

FIG. 2
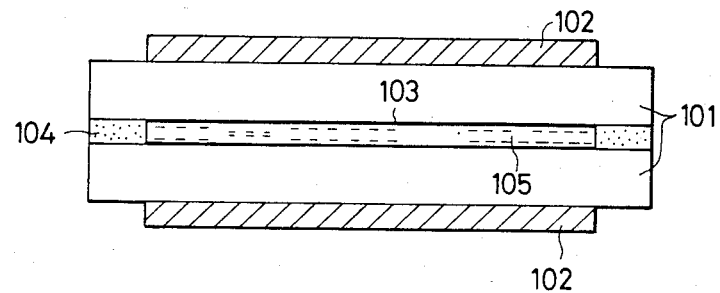
FIG. 3-a
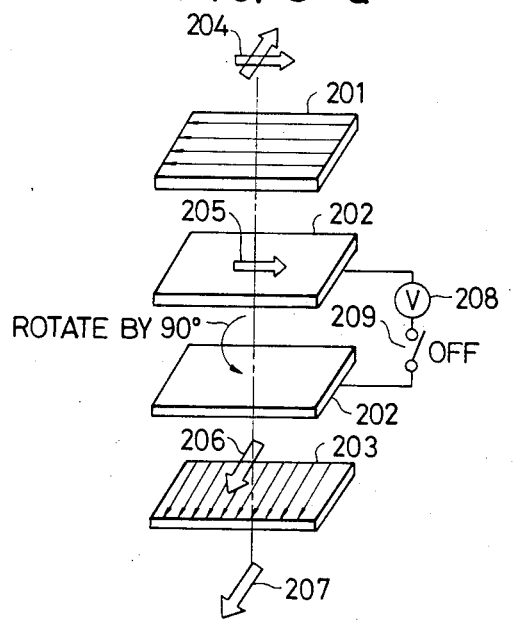
FIG. 3-b
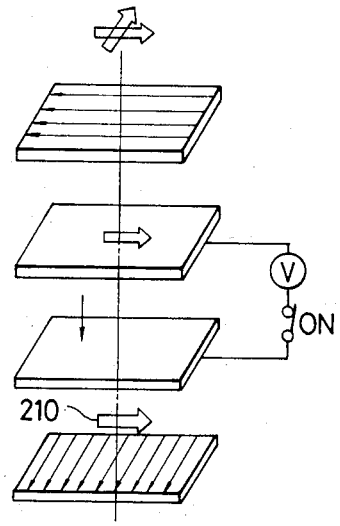

FIG. 9
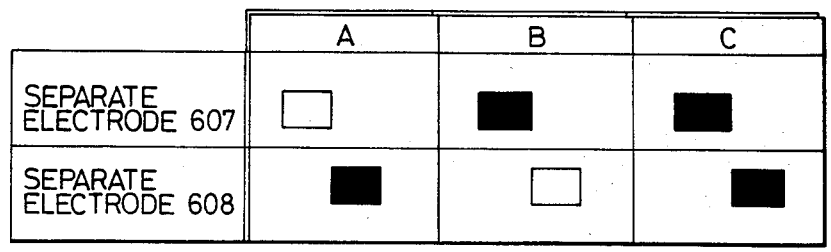
FIG. 10
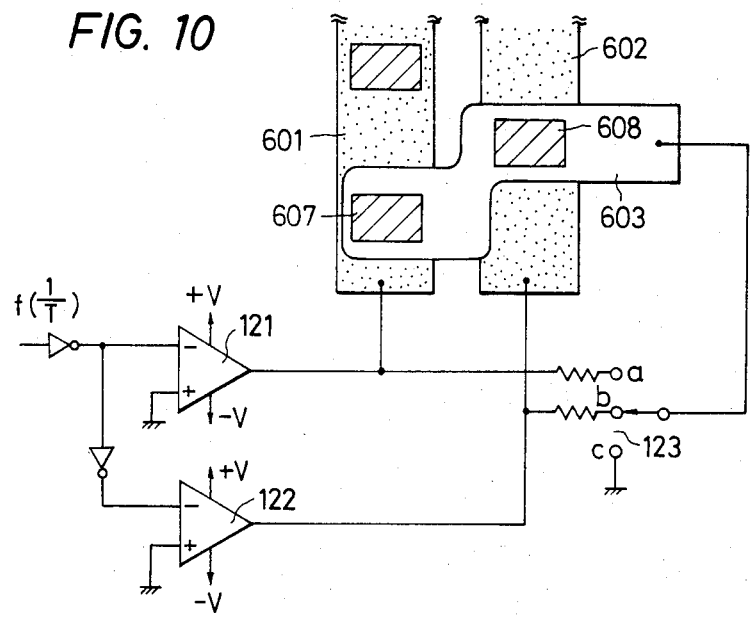
FIG. 13
| AMPLITUDE | DIGITAL SIGNAL | | | | | |
|---|---|---|---|---|---|---|
| | d | e | f | g | h | i |
| $V_{-2}$ | 1 | 1 | 1 | 0 | 0 | 0 |
| $V_{-1}$ | 1 | 1 | 0 | 0 | 0 | 0 |
| $V_0$ | 1 | 0 | 0 | 0 | 0 | 0 |
| $V_1$ | 0 | 0 | 0 | 0 | 0 | 0 |
| $V_2$ | 0 | 0 | 0 | 0 | 1 | 1 |
| $V_3$ | 0 | 0 | 0 | 1 | 1 | 1 |

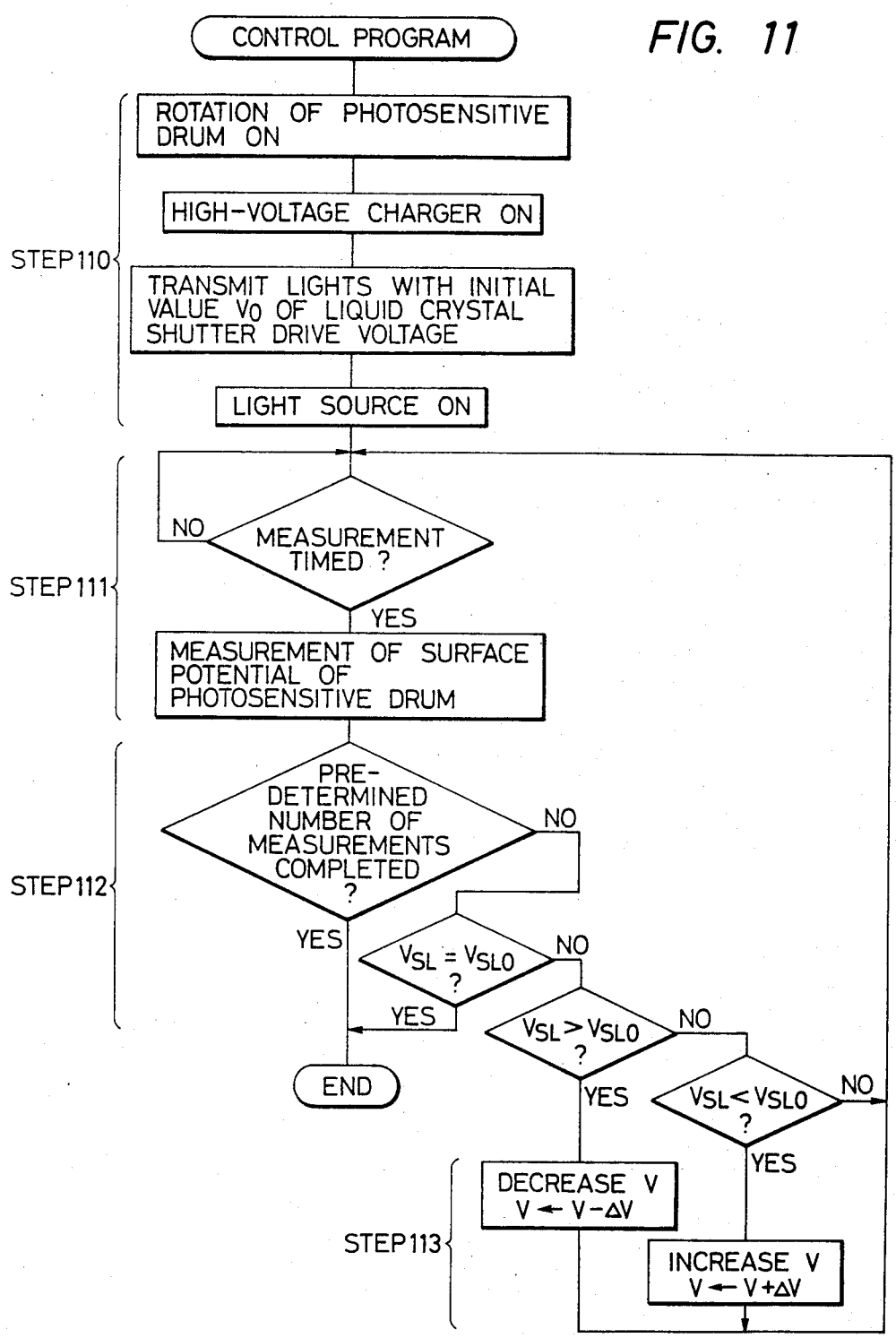

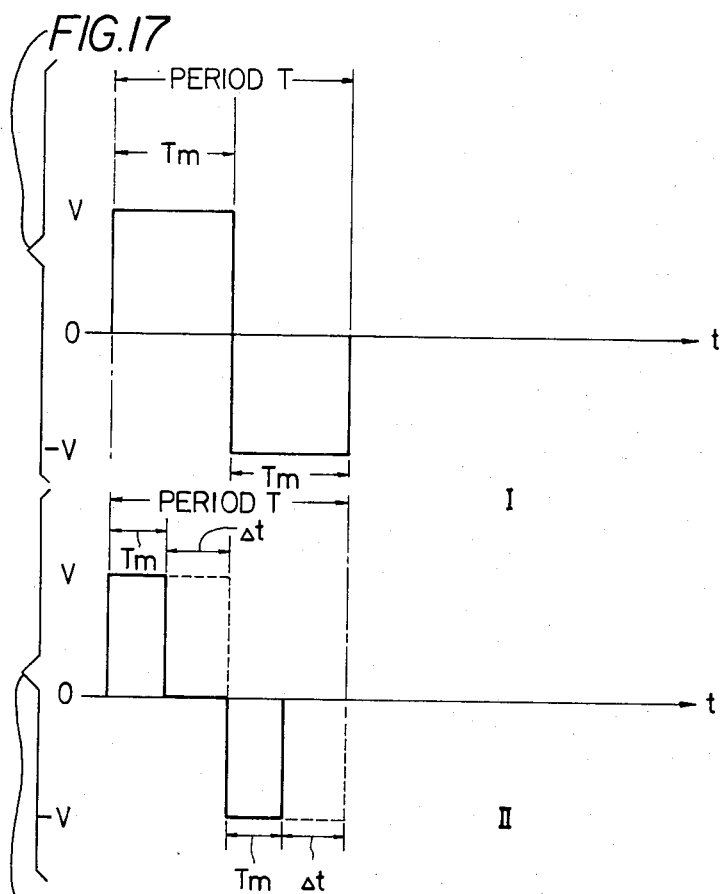

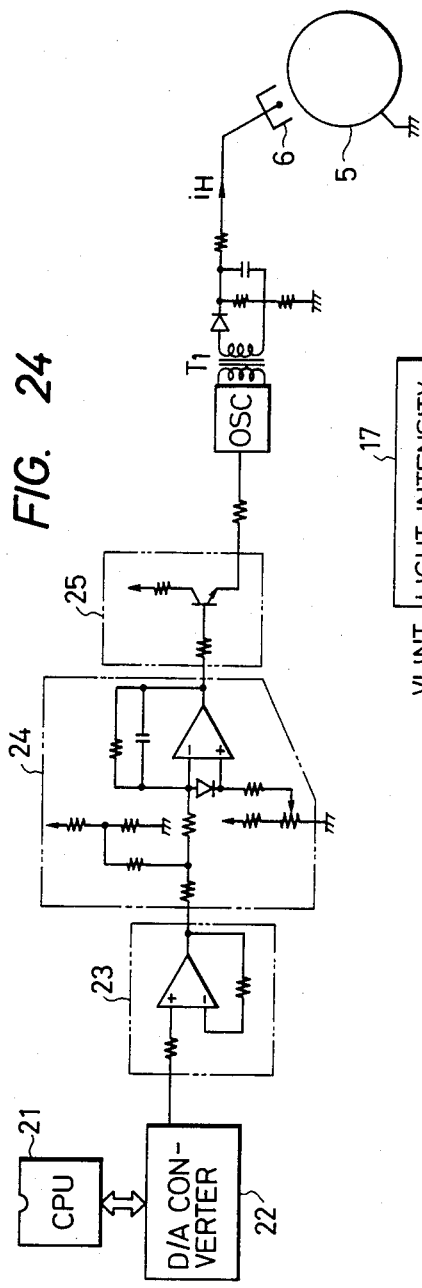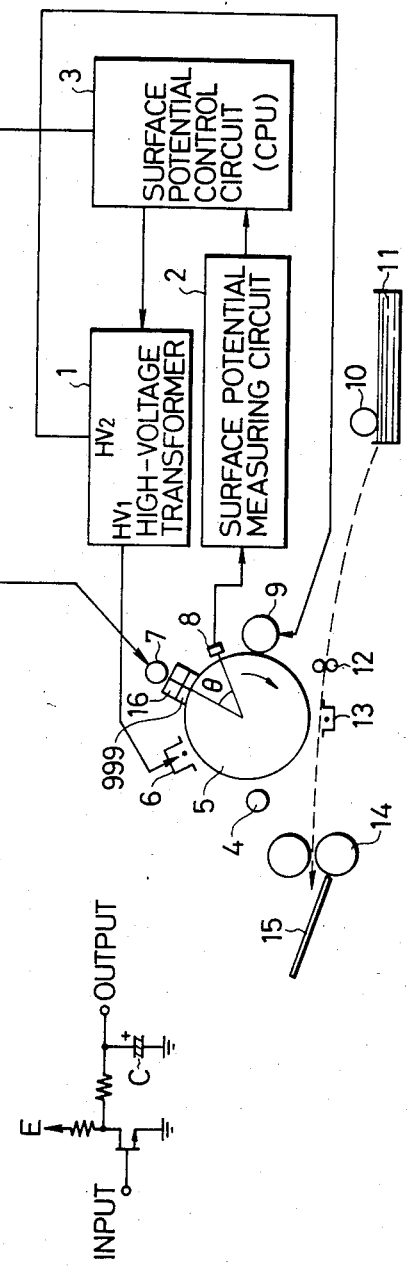
FIG. 24
FIG. 25
FIG. 26

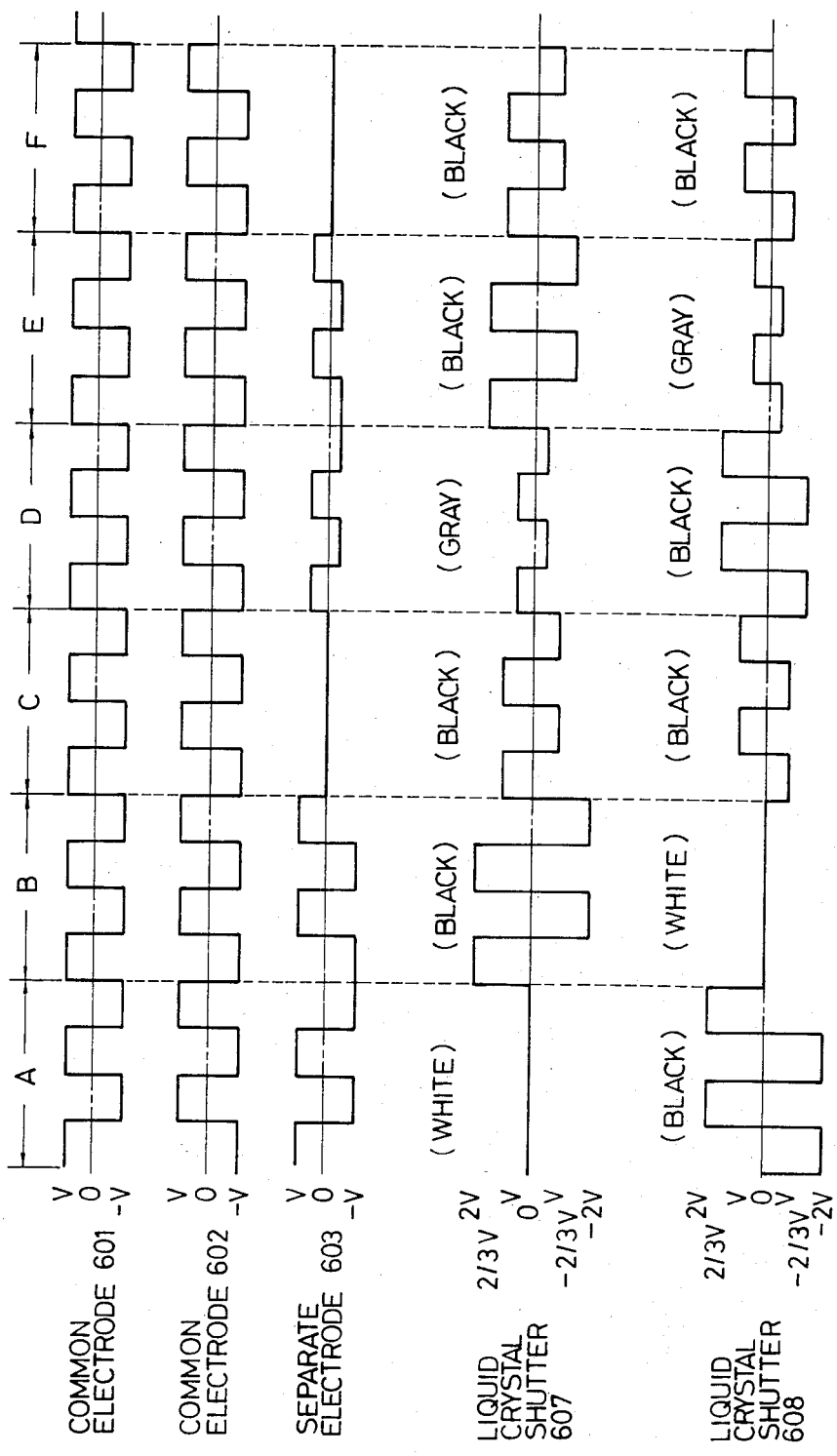

|  | Y0 | Y1 | Y2 | OUT |  |
|---|---|---|---|---|---|
| WHITE | 1 | 0 | 0 | A | ▢ |
| BLACK | 0 | 1 | 0 | C | ■ |
| GRAY | 0 | 0 | 1 | D | ▨ |

IMAGE PROCESSOR

This application is a continuation of application Ser. No. 589,582 filed Mar. 14, 1984, now abandoned.

BACKGROUND OF THE INVENTION

1. Field of the Invention

The present invention relates to an image-processing apparatus provided with light-controlling means.

2. Description of the Prior Art

In the art there have been proposed various image-processing apparatus such as a printer and a hybrid copying machine functioning as a copier and also as a printer.

One of the most difficult problems involved in known image-processing apparatus is stabilization of the image quality. This is true in particular for those image processors which use a light shutter. The light shutter used in this type of apparatus may include, for example, a liquid crystal. The transmittance of such a liquid crystal is not constant but is very variable with variation in threshold voltage as well as with the change of temperature, humidity etc. Because of this drawback, it is very difficult to obtain constantly good images with consistent quality.

SUMMARY OF THE INVENTION

Accordingly it is the general object of the present invention to solve the above-mentioned problem.

More specifically it is an object of the invention to provide an image-processing apparatus which can produce high quality images in a stable manner.

It is another object of the invention to provide an image-processing apparatus which comprises first image-processing means for forming images on a photosensitive member in accordance with the light from an original exposed by a light source, and second image-processing means for forming images on the photosensitive member by controlling the light by means of light control means.

It is a further object of the invention to provide an image-processing apparatus in which the conditions for image-processing can be controlled according to the state of the apparatus.

It is still a further object of the invention to provide an image-processing apparatus which can produce multi-digitalized images by controlling the driving of light control means.

Therefore, in accordance with one aspect of the invention, the image processing apparatus according to the present invention includes, among other features, means for placing an original thereon, image forming means for forming images on a recording member from light and reflected by an original, control means disposed in the path through which light is transmitted from the placing means to the recording member for controlling the amount of light transmitted therethrough to the recording member, output means for providing an image signal to control means and means for switching the apparatus to a first mode for forming images in response to the original or to a second mode for forming images in response to an image signal provided to an output means, wherein in the first mode, the control means allows for reflected light from the signal to be transmitted therethrough to the image forming means so as to form images in response to the original and, in the second mode, the control means controls the amount of light transmit therethrough in response to an image signal generated by the output means so as to form images in response to the image signal.

Other features and advantages of the invention will appear more fully from the following description taken in connection with the accompanying drawings.

BRIEF DESCRIPTION OF THE DRAWINGS

FIG. 2 is a sectional view showing the structure of a liquid crystal shutter array used in the apparatus;

FIG. 3-a illustrates how the light is transmitted through the liquid crystal shutter when no voltage is applied to the transparent electrode 202;

FIG. 3-b illustrates how the light is cut off by the liquid crystal shutter when a voltage is applied to the transparent electrode 202;

FIG. 9 illustrates the transmission and cut-off of light by separate electrodes;

FIG. 10 shows a driving circuit of the liquid crystal shutter;

FIG. 11 is a flow chart of amplitude control by the surface potential control circuit (CPU) to obtain a proper image;

FIG. 13 shows the relation of output to input of D/A converter 701 of FIG. 12;

FIGS. 17 and 18 illustrating duty ratios;

FIG. 24 shows a high voltage control circuit of the high voltage charger 6;

FIG. 26 shows an example of D/A converter;

FIG. 26 is a block diagram of an image processor provided with a light quantity control circuit;

FIG. 36-a shows an input image signal;

FIG. 36-b shows the first dither matrix therefor;

FIG. 36-c shows the second dither matrix therefor;

FIG. 36-d shows the ternary color image signal resulted therefrom;

FIG. 37 shows the driving waveforms of the liquid crystal shutter for the representation of half-tone;

FIG. 46 shows the signal waveforms at P-part of the liquid crystal shutter; and

DESCRIPTION OF PREFERRED EMBODIMENTS

Figure 1:
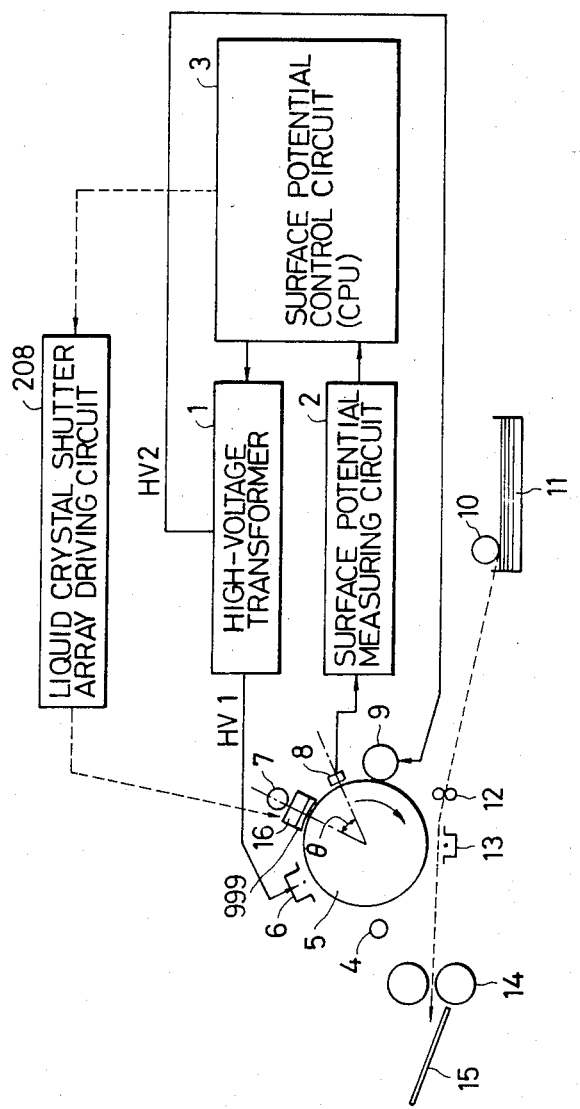
FIG. 1 is a block diagram of an image processor to which the present invention has been applied.

Referring first to FIG. 1 there is shown an image processor according to the present invention. In this embodiment, the image processor is formed as a photo printer employing a liquid crystal shutter array for controlling the transmission of light and producing the contrast of each picture element, for example, in white-and-black contrast thereby forming an image.

In the figure, 1 is a high-voltage transformer, 2 is a surface potential measuring circuit, 3 is a surface potential control circuit (CPU) containing A/D, D/A converters, a random access memory (RAM) etc. and 6 is a high-voltage charger. Designated by 5 is a photosensitive drum which is charged by the high-voltage charger 6 and exposed to light through a liquid crystal shutter array 16. Since the liquid crystal shutter array 16 is a transmission type, it is illuminated by a light source 7. 208 is a liquid crystal shutter array driving circuit. 8 is a surface potential sensor the output of which is introduced into the surface potential measuring circuit 2. 9 is a developing cylinder at which an electrostatic latent image is developed to a visible image.

The visualized image is then transferred onto a copy paper under the action of a transfer charger 13. The copy paper is fed from a paper supply cassette 11 through a paper feed roller 10. A pair of registering rollers 12 determines the timing for paper feed so that the fore end of the copy paper can be correctly registered with the fore end of the image on the drum 5. The transferred toner image on the copy paper is fixed by a pair of fixing rollers 14 and then discharged into a paper discharge tray 15. After transferring, the photosensitive drum 5 is electrostatically cleaned up by an eraser 4. Thus, the drum is prepared for the next image formation. 999 is a lens for condensing the light, which may be, for example, a cylindrical lens.

FIG. 2 is a sectional view of the liquid crystal shutter array showing the detailed structure of it.

In FIG. 2, the reference numeral 101 denotes a glass substrate and 102 denotes a polarizing plate. 103 is a transparent electrode, 104 is a retaining member, and 105 is liquid crystal material. As seen from the figure, the liquid crystal material is sandwiched in between two polarizing plates 102. The transparent electrode is disposed between the liquid crystal material and the upper polarizing plate and between the liquid crystal material and the lower polarizing plate. With this arrangement, the light is transmitted when no voltage is applied to the transparent electrode and the light is shut off when a voltage is applied to the electrode. In order to drive the liquid crystal, thin film transistor may be used.

When no voltage is applied to the transparent electrode 103, the light is transmitted through the liquid crystal shutter array in the manner illustrated in FIG. 3-a.

In FIG. 3-a, the reference numeral 204 represents rays of light running in all directions such as natural light. 201 and 203 are polarizing plates the polarization axes of which are indicated by narrow arrows. The two polarizing plates 201 and 203 are disposed in such manner that the polarization axis of the polarizing plate 201 is orthogonal to that of the polarizing plate 203. As the light 204 is polarized by the polarizing plate 201, only the polarized light in the direction of wide arrow 205 can reach the liquid crystal material (not shown) passing through the transparent electrode (upper one) 202. The orientation of the liquid crystal molecules of the liquid crystal material sandwiched in between the transparent electrodes 202 is distorted by 90°. Because of it, the light 205 rotates 90° and then passes through the transparent electrode (lower one) 202. The light is indicated by the wide arrow 206. Since the direction of the light 206 is the same as the direction of the polarization axis of the polarizing plate 203 indicated by the narrow arrows thereon, the light 206 is allowed to pass through the polarizing plate 203 without being changed. The light emerges from the polarizing plate 203 as the light 207. 208 is a power supply for applying a voltage to the transparent electrode. The power supply 208 is turned On and Off by a switch 209.

When a voltage is applied to the transparent electrode 202, the light is shut off by the liquid crystal shutter array 16 in the manner shown in FIG. 3-b.

As a voltage is applied to the transparent electrodes 202, the molecules of the liquid crystal material between the electrodes are all oriented regularly in the direction from one substrate to the other substrate. Therefore, the light does not rotate in the liquid crystal material and enters the polarizing plate 203 as the light 210 the direction of which is different from the direction of the above-mentioned light 206. Therefore, no light is allowed to pass through the polarizing plate 203 in the direction of the polarization axis thereof. Thus, under this condition, the light is cut off.

Figure 4:
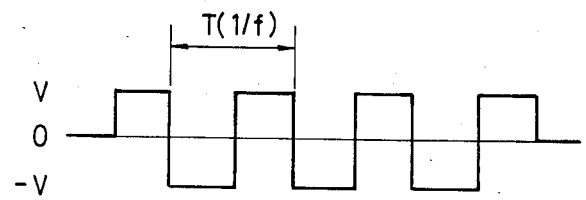
FIG. 4 shows the liquid crystal shutter driving waveform T (1/f)

As shown in FIG. 3, the liquid crystal shutter is driven by the power supply 208. As for liquid crystal it is generally known that when DC (direct current) is used to drive the liquid crystal, the characteristics of the liquid crystal deteriorate in a short time. Therefore, the liquid crystal must be driven by AC (alternate current). FIG. 4 shows the driving waveform (square wave) used to drive the liquid crystal shutter. In FIG. 4, f is the frequency thereof and T (1/f) is the period thereof.

Figure 5:
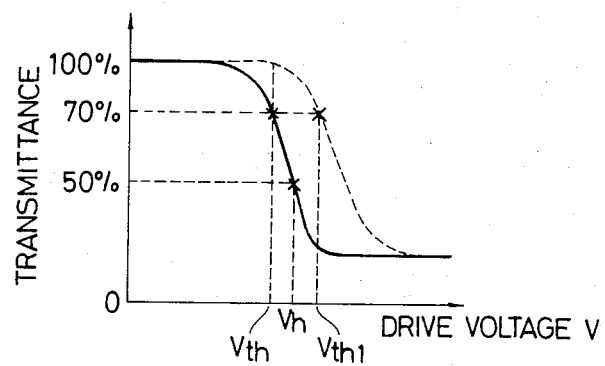
FIG. 5 shows the relationship between drive voltage and transmittance.

FIG. 5 shows the relation between driving voltage and transmittance.

As seen from this curve, the transmittance reaches 100% when the drive voltage V=0 (zero) during the driving of the liquid crystal. The transmittance decreases gradually with increasing drive voltage. Finally the light is shut out. The drive voltage at which the transmittance becomes 70% is generally called the threshold voltage for light-on (Vth). In FIG. 5, the broken-line curve shows the case in which the drive frequency has been increased. As to this case, a further description appears below.

Figure 6:
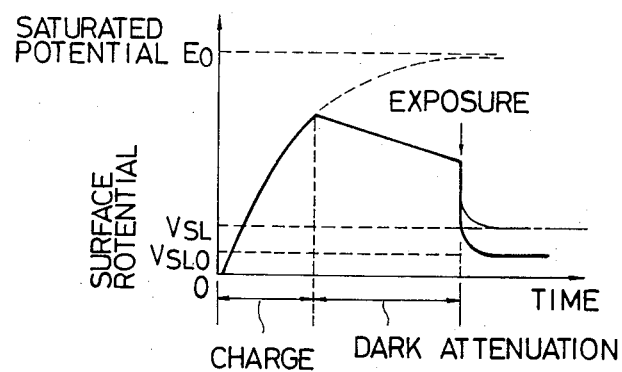
FIG. 6 shows the change of surface potential on the photosensitive drum 5 during an image formation process.

FIG. 6 is a curve showing the change of the surface potential on the photosensitive drum 5 with time during one image-forming process.

The photosensitive drum 5 is at first charged by the charger 6 to a surface potential. The surface potential continuously attenuates during a dark attenuation period up to the exposure point at which the drum 5 is exposed to the light from the liquid crystal shutter array 16 and from the light source. $V_{SLO}$ indicates the level of the surface potential obtained when the drum surface is irradiated with light with the liquid crystal shutter being fully opened. The aimed potential $V_{SLO}$ is not always necessary to be the value obtained when the liquid crystal shutter is fully opened. From the curve in FIG. 6 it is readily seen that the attenuation of the surface potential by exposure becomes larger with larger exposure value. The meaning of $V_{SL}$ will be described below.

Figure 7:
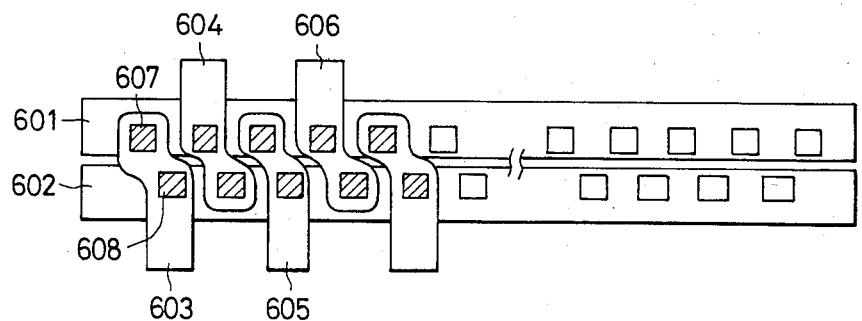
FIG. 7 shows a common structure of liquid crystal shutter array.

FIG. 7 shows a structure of a liquid crystal shutter array commonly used at present. 601 and 602 are common electrodes, 603, 604, 605 and 606 are separate electrodes and 607, 608 are liquid crystal shutter parts. As seen from the figure, the liquid crystal shutter parts 607, 608 are laid on the common electrodes 601, 602, and the separate electrodes 603, 604 are laid on the liquid crystal shutter parts 607, 608. In brief, the liquid crystal shutter has a kind of sandwich structure.

Figure 8:
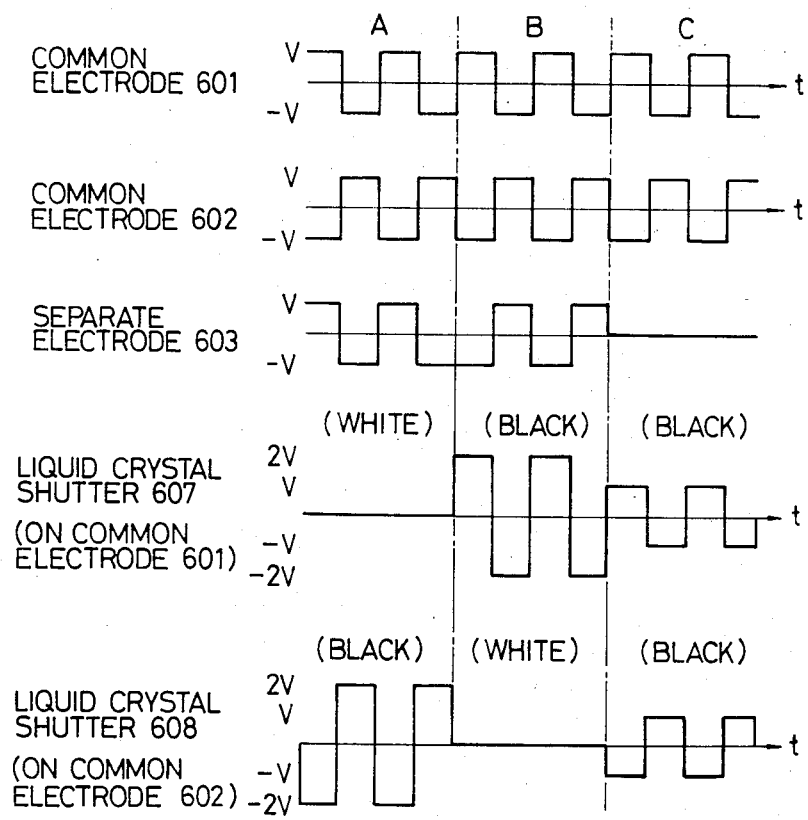
FIG. 8 shows the waveforms of signals applied to the liquid crystal shutter array.

For example, when signal waveforms as shown in FIG. 8 are applied to the common electrodes 601, 602 and the separate electrode 603, there will be applied to the elements 607 and 608 voltages having waveforms as shown in FIG. 8. Consequently, as previously described, the light is transmitted at the point to which the voltage is being applied and the light is cut off at the point to which no voltage is being applied. FIG. 9 is a graphic illustration of this phenomenon. In FIG. 9, the block painted in black represents the state in which light is cut-off. A, B and C correspond to A, B and C shown in FIG. 8 respectively. For signal-writing, it is impossible that both of the elements 607 and 608 are in transmission mode at the same time. However it is to be understood that for other times all liquid crystal elements corresponding to all picture elements can easily be brought into the transmission mode or cut-off mode at the same time by rendering the two common electrodes 601 and 602 in-phase.

FIG. 10 shows the driving circuit for one electrode section of the liquid crystal shutter.

Again, f represents the frequency of the AC square wave for driving the liquid crystal shutter. 121 and 122 are comparators to which the frequency f is put in. Upon the input of f, the comparator 121 generates an in-phase pulse which is applied to the common electrode 601. The comparator 122 generates an antiphase pulse which is applied to the common electrode 602. 123 is a change-over switch which can select any one of a, b, c for a picture signal. These three cases correspond to the cases of A, B, C sections in FIGS. 8 and 9.

As previously shown in FIG. 5, the transmittance of the liquid crystal shutter changes depending on the drive voltage (amplitude) V. This means that the quantity of exposure on a photosensitive medium can be controlled by changing the drive voltage V. The following table, Table 1 shows the relationship of the drive voltage to the transmittance of liquid crystal shutter, the quantity of exposure on the photosensitive medium, the intensity of image etc.

TABLE 1

| Drive Voltage | low | ← V → | high |
|---|---|---|---|
| Transmittance of Liquid Crystal Shutter | high | | low |
| Quantity of Exposure on Photosensitive Medium | large | | small |
| Intensity of Image | thin | | thick |
| Color | white | ← gray → | black |

If the liquid crystal shutter 16 shown in FIG. 1 is set to its initial drive voltage (amplitude) Vo by the liquid crystal shutter array driving circuit 208 and the photosensitive drum 5 is exposed under the condition, then the surface potential on the drum must normally drop down to the level of $V_{SLO}$ as shown in FIG. 6. However, there may be a case where the surface potential does not drop down up to the target value $V_{SLO}$ but for some reason drops to the level of $V_{SL}$ only. This means under-exposure. Therefore, in this case, it is required to decrease the initial drive voltage V, measure the surface potential again and feed it back to the drive voltage (amplitude) V until the target value $V_{SLO}$ is attained. In this manner, in order to obtain good and proper images, the drive voltage amplitude must be controlled. This control is carried out through the surface potential control circuit (CPU) containing A/D, D/A converters, RAM etc. and the liquid crystal array driving circuit 208. A flow chart of this drive voltage amplitude control is shown in FIG. 11.

At the first step 110, the photosensitive drum 5 is rotated and exposed to the light from the light source 7 with the initial value Vo of liquid crystal shutter drive voltage.

At the next step 111, the surface potential on the drum is measured at a determined timing. The measurement timing corresponds to the angle θ from the exposure point to the surface potential measurement point shown in FIG. 1. This is applied also to measurement after the control of V at step 113.

At the third step 112, it is verified whether or not a predetermined number of measurements (for example, four times) has been completed. When completed, the rotation of drum for control is terminated. Also, if the measured surface potential $V_{SL}$ is coincident with the target surface potential, then the rotation for control is terminated. On the contrary, if the measured surface potential and the target surface potential do not meet each other, the step 113 is executed.

At the step 113, the drive voltage (amplitude) is controlled by the following procedure:

When $V_{SL} > V_{SLO}$, that is, when the measured potential is higher than the target, which means a shortage of light, the drive voltage is decreased to increase the transmittance of the liquid crystal shutter, thereby making the measured potential approach the aimed potential, $V_{SLO}$.

On the contrary, if $V_{SL} < V_{SLO}$, the drive voltage V is increased to make the measured potential approaching the aimed potengial, $V_{SLO}$.

Figure 12:
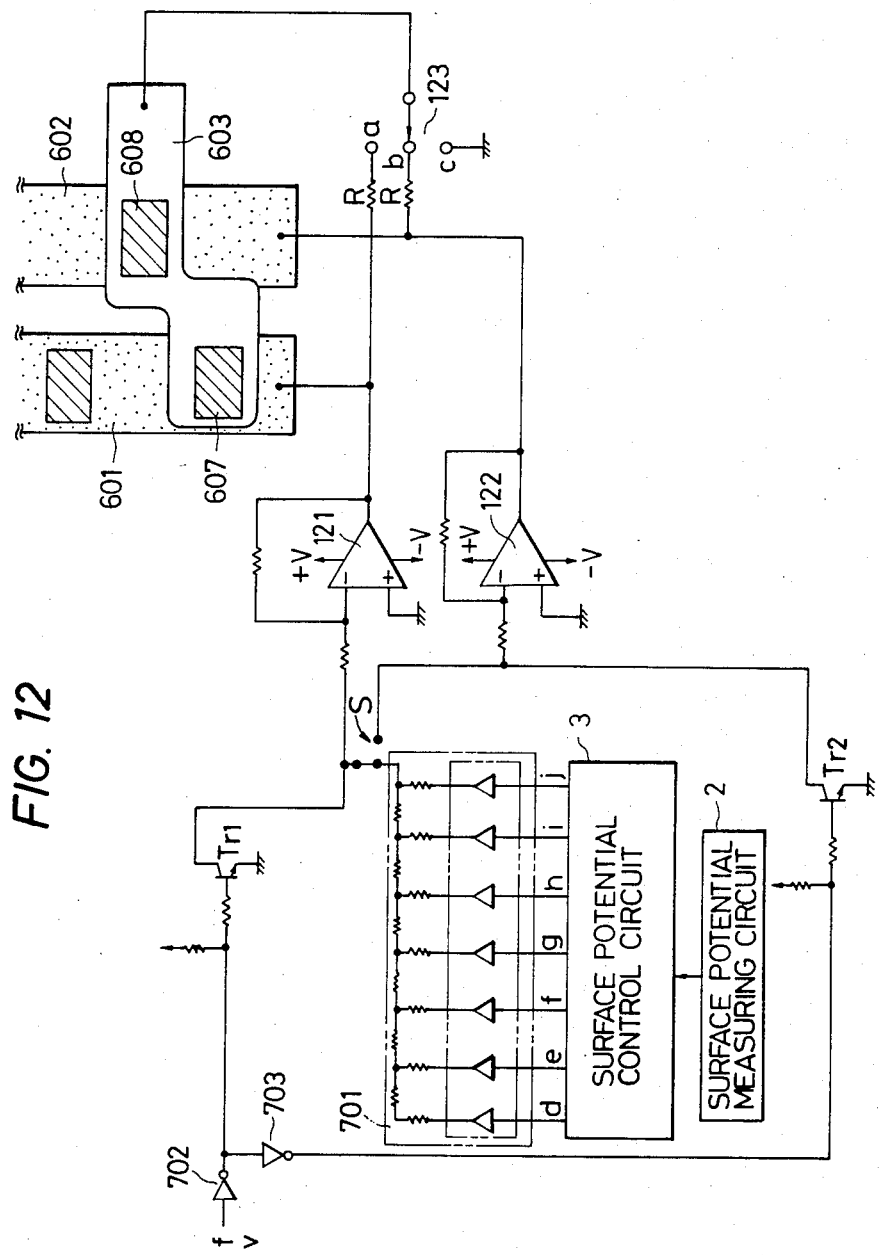
FIG. 12 shows an amplitude control circuit.

FIG. 12 shows a concrete form of the control circuit for controlling the amplitude V of the liquid crystal shutter array 208 shown in FIG. 1.

In FIG. 12, the comparators 121, 122 correspond to those shown in FIG. 10. Through an inverter 702 and a transistor Tr1, a fundamental clock signal with a frequency f and amplitude V is provided to the input of the comparator 121. The clock signal is also provided through inverters 702, 703 and transistor Tr2 to the input of the comparator 122. A D/A converter 701 is connected to the comparators 121 and 122 through a switch S. The converter 701 converts digital signals d, e, f, g, h, i from the surface potential control circuit 3 into analog signals. The switch S functions in response to the ON-OFF conditions of the transistors Tr1 and Tr2; in other words, D/A converter 701 is connected to comparator 121 through switch S when Tr1 is OFF and to comparator 122 through switch S when Tr2 is OFF.

In response to the digital input signals, the D/A converter 701 provides amplitudes (initial value is Vo), for example, V-2, V-1, . . . V3 as shown in FIG. 13. The surface potential control circuit 3, as shown in FIG. 1, receives signals from the surface potential sensor 8, the surface potential measuring circuit 2, and generates the corresponding outputs, an example of which is 110000. This output signal is converted into amplitude V-1 by D/A converter 701 and then the converted signal is input to the comparators 121 and 122 via switch S. These amplitude values V-2, V-1 . . . V3 have a difference of ΔV among them. The difference ΔV has been shown in FIG. 11, at step 113. As the input picture signal to the separate electrode 603, any one of a, b, c can be selected by the changeover switch 123 like the circuit shown in FIG. 10.

Hereinafter another embodiment of the invention will be described. This is an embodiment in which the above-mentioned threshold voltage for light-on (Vth) is controlled by changing the drive frequency f (or period T) in FIGS. 4 and 10 so as to obtain good images. This embodiment has been realized making use of the fact that the threshold voltage (Vth) changes with changing the period T of the drive waveform (see the curves in solid line and broken line in FIG. 5).

Usually the frequency f (1/T) is in the range of several tens Hz to several hundreds Hz. But, it is known to those skilled in the art that the threshold voltage Vth rises with higher frequency. The reason for this is that in the high frequency range the orientation of the liquid crystal molecules is no longer changed in a definite direction even when a voltage is applied to the liquid crystal. It is said that the high frequency is generally above 1 KHz. The broken line part of the curve in FIG. 5 shows it. More particularly, when the frequency f becomes higher, the threshold voltage changes from Vth to Vth1 and therefore the curve shifts from the solid line to the broken line. Consequently, the state of liquid crystal cell changes from light-cutoff state to light-transmission state with increasing of f provided that the drive voltage V is kept constant. In other words, there occurs change of black→gray→white.

Figure 14:
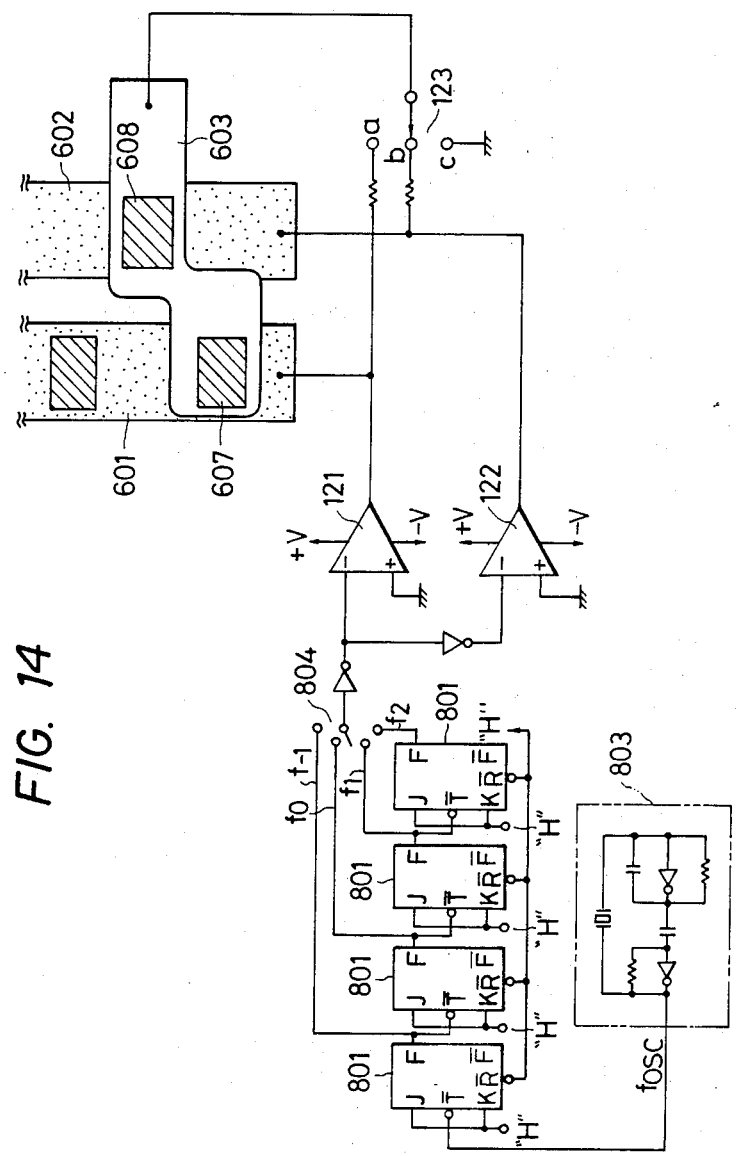
FIG. 14 shows a frequency (period) control circuit.

A circuit for the frequency control of liquid crystal drive signal is shown in FIG. 14.

In this figure, 601 and 602 are common electrodes as previously shown in FIGS. 7, 10 and 12. 607 and 608 are liquid crystal shutter parts. 603 is a separate electrode, and 121 and 122 are again comparators. 801 are J-K flip-flops. 803 is a frequency-dividing circuit. The frequency divider 803 and J-K flip-flop are well-known in the art and need not be further described.

In the shown embodiment, the frequency to be used can be selected among f-1, fo, f1 and f2 (corresponding to T-1, To, T1 and T2 respectively). The selection of frequency can be made by a switch 804.

Figure 15:
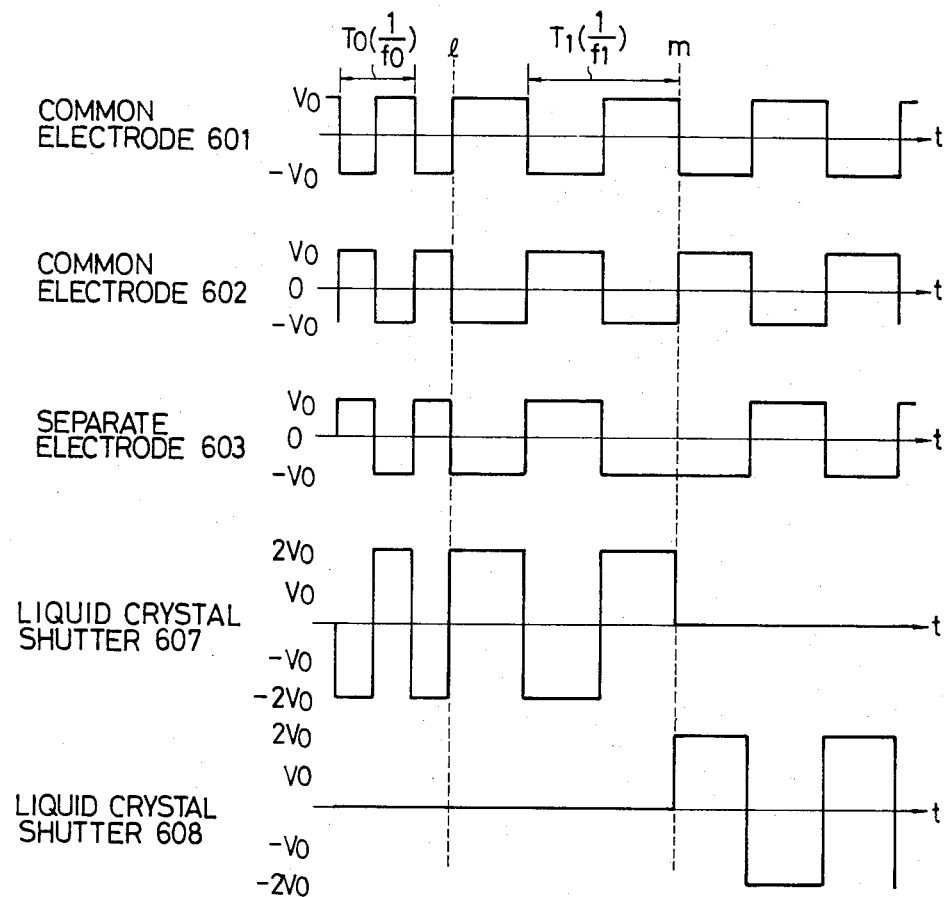
FIG. 15 shows signal waveforms to be frequency (period)-controlled.

FIG. 15 shows liquid crystal drive waveforms as obtained when the frequency (or period) is changed. l is the time point at which the period was changed from To to T1 and m is the time point at which the switch 123 in FIG. 14 was switched over from b to a.

Figure 16:
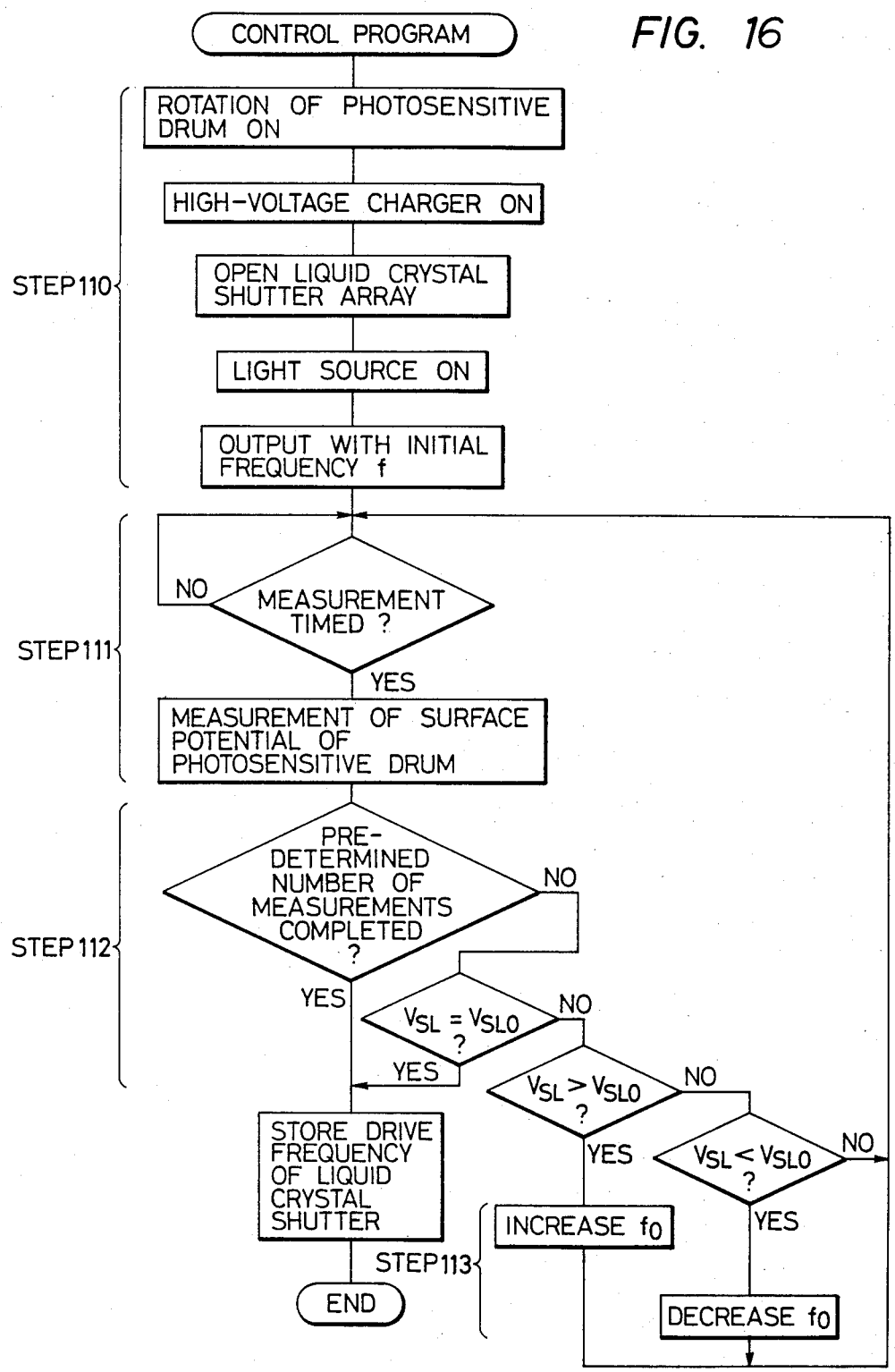
FIG. 16 is a flow chart of frequency (period) control.

FIG. 16 shows a flow chart for the abovedescribed frequency (period) control of liquid crystal drive signal. Since FIG. 16 corresponds to FIG. 11, the step numbers used in FIG. 11 are used also in FIG. 16.

At step 113, if $V_{SL} > V_{SLO}$, it means underexposure. Therefore, the transmittance of liquid crystal part is increased (with a constant amplitude). In other words, the drive frequency is increased to the broken line portion of the curve in FIG. 5.

A further embodiment for the control of the transmittance of liquid crystal shutter part is possible within the scope of the invention, which will hereinafter be described with reference to FIGS. 17 through 22.

According to the embodiment, the control of transmittance required to obtain proper exposure value for good image is carried out by changing the duty ratio of the liquid crystal drive waveform. The term duty ratio as used herein means the ratio of voltage-ON time to one period.

In the case of liquid crystal driven by the application of a voltage whose peak value is variable, it can be said generally that the liquid crystal is turned ON when the effective value of the applied waveform reaches the light start voltage, that is, the threshold voltage Vth.

Referring to FIGS. 17 and 18 there are shown two areas I and II, respectively. In the area I, the duty ratio is 100% and the pulse absence duration Δt is 0 (zero). In the area II, the duty ratio is 50% and there is a pulse absence duration of 2×Δt. According to the embodiment now being discussed, the duty ratio is controlled by controlling the duration Δt or the voltage-ON time Tm thereby controlling the exposure value, surface potential for a good image.

Figure 19:
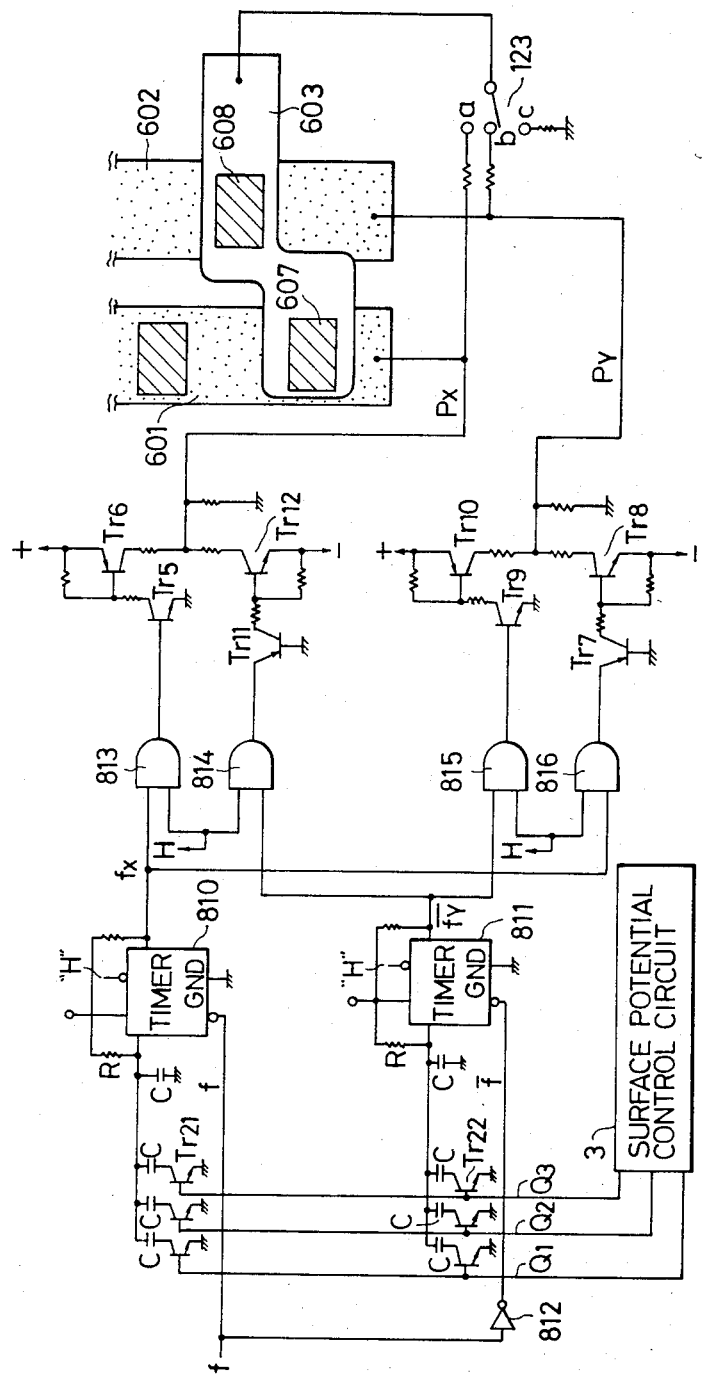
FIG. 19 shows the duty ratio control circuit.

FIG. 19 shows a circuit for controlling the duty ratio of liquid crystal waveform.

810 is a timer which is connected with a drive signal line (frequency: f), selection signal lines Q1, Q2, Q3 from the surface potential control circuit 3, transistor group Tra1 and also with C, R. 811 is also a timer which is also connected with the drive signal line (frequency: f, but) through an inverter 812. The drive signal passed through the inverter 812 is designated by f̄. Also connected to the timer 811 are selection signal lines Q1, Q2, Q3 from the surface potential control circuit 3, transistor group Tra2 and C, R. The output time constant of the timers is determined by the value of C.R. Therefore, the time constant can selectively be determined by rendering the desired transistor(s) conductive by means of selection signals Q1, Q2, Q3 to select the number of capacitors C while keeping the resistor R constant. The outputs f̄X and f̄Y from the timers 810 and 811 are inverted ones by the inverter 812. The manner of operation of the above duty ratio control circuit is as follows:

AND-gates 813 and 816 are opened by the output fX from the timer 810. As the AND-gate 813 is opened, transistors Tr5 and Tr6 are rendered conductive and the output PX (voltage-ON time Tm) is applied to the common electrode 601. Since ANd-gate 816 is opened simultaneously with the opening of AND-gate 813, transistors Tr7 and Tr8 are also rendered conductive. However, because of the minus potential at the emitter of the transistor Tr8, an output signal PY is applied to the common electrode 602. The applied signal PY to the common electrode 602 is the same in absolute value but opposite in polarity (sign) to the applied signal PX to the common electrode 601.

AND-gate 814 and 815 are opened by the output f̄Y from the timer 811. The opening of AND-gate 815 renders transistors Tr9 and Tr10 conductive to apply the output of the timer 811 (voltage-ON time Tm) to the common electrode 602 as signal PY. Similarly the opening of AND-gate 814 renders transistors Tr11 and Tr12 conductive. However, because of the minus potential at the emitter of transistor Tr12, an output signal PX is applied to the common electrode 601. The output signal PX applied to the common electrode 601 has the same absolute value but opposite polarity to the output signal PY applied to the common electrode 602.

Figure 20:
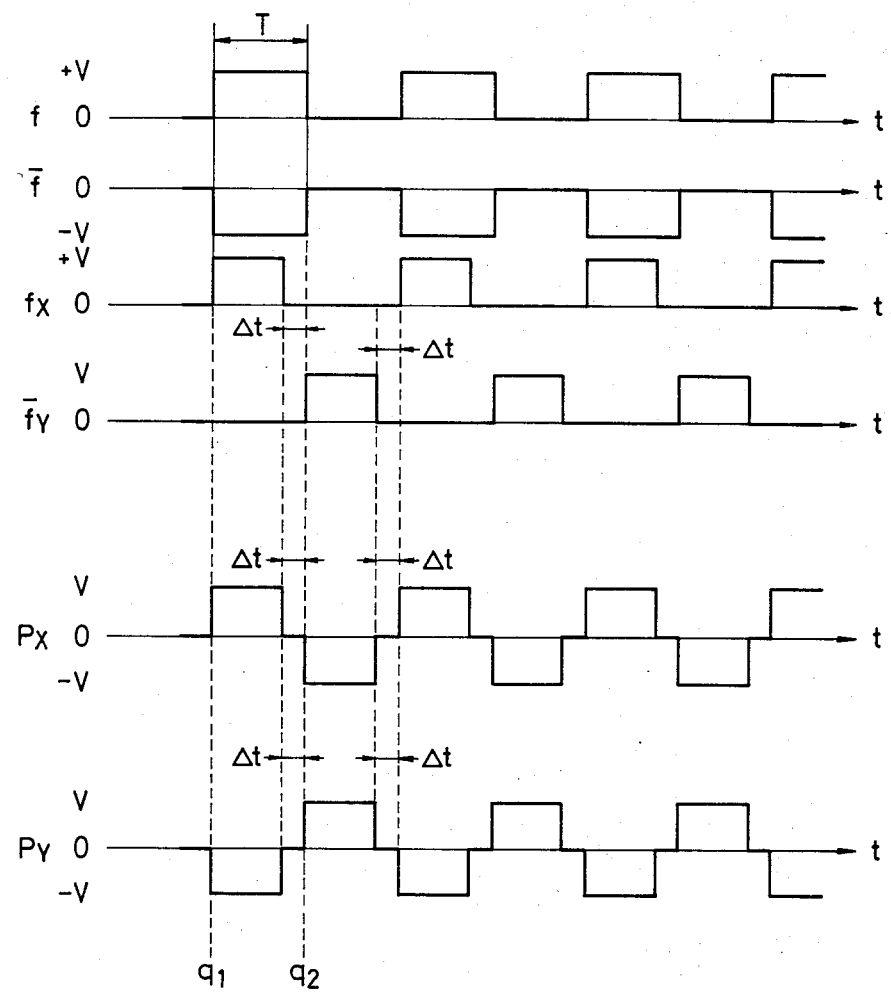
FIG. 20 shows signal waveforms to be duty ratio-controlled.

FIG. 20 is a timing chart of the abovedescribed signals for driving liquid crystal.

The above-mentioned signals fX and fY are signals generated with the rise of signals f and f at the voltage-ON time Tm determined by C.R time constant from the timers 810 and 811 respectively. For example, the first rise of signal fX is at the point $q_1$ and that of signal f̄Y is at the point $q_2$ in FIG 20.

Figure 21:
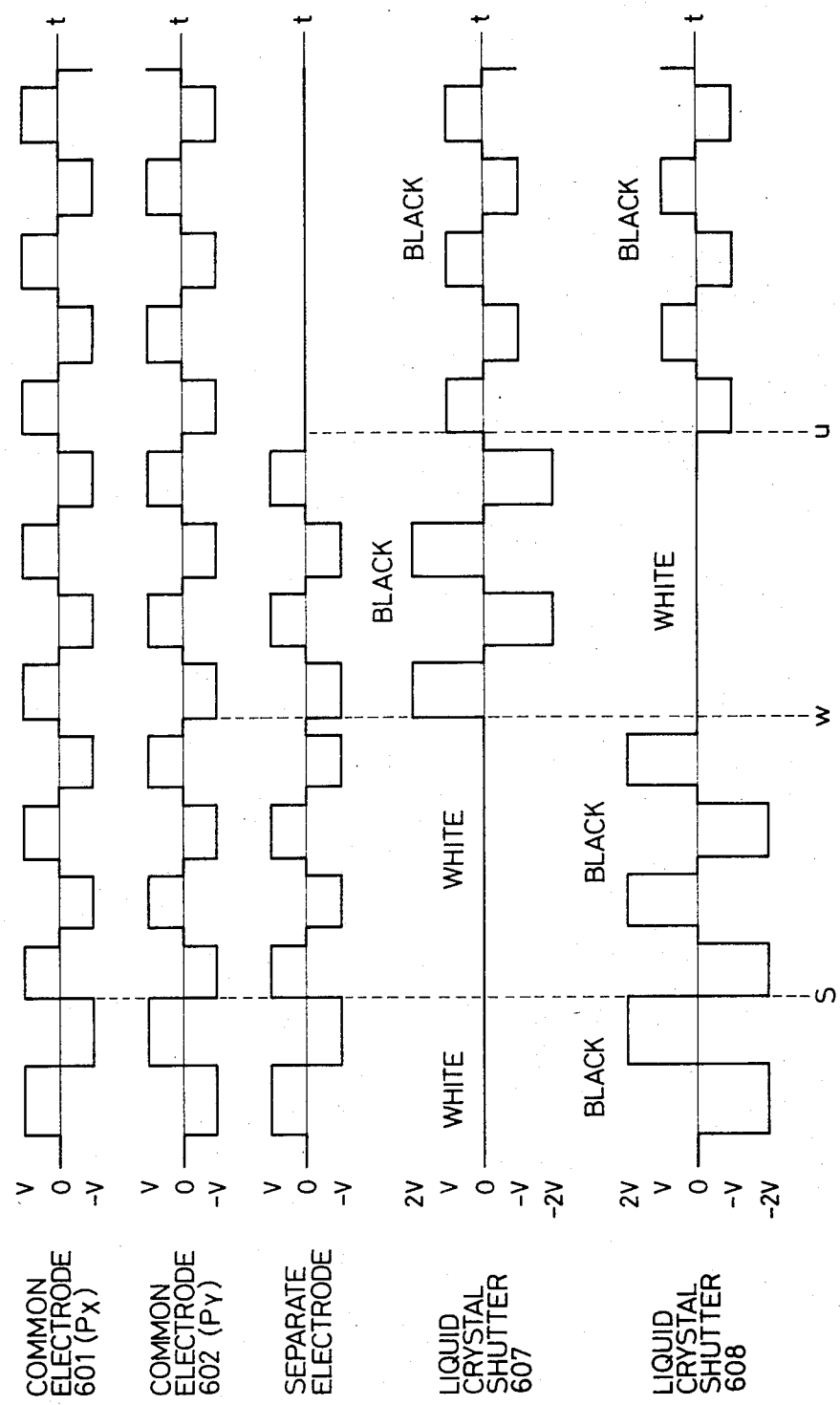
FIG. 21 shows liquid crystal shutter driving waveforms.

FIG. 21 shows the waveforms for driving the above liquid crystal shutter parts.

The signal waveform applied to the common electrode 601 in FIG. 21 corresponds to the output PX in FIG. 20. The signal waveform applied to the common electrode 602 corresponds to the output PY in FIG. 20. The duty ratio control was started after the point S. At the point w, the switch 123 as shown in FIG. 19 was switched over to terminal a and at the point u the switch was further switched over to terminal c.

Figure 22:
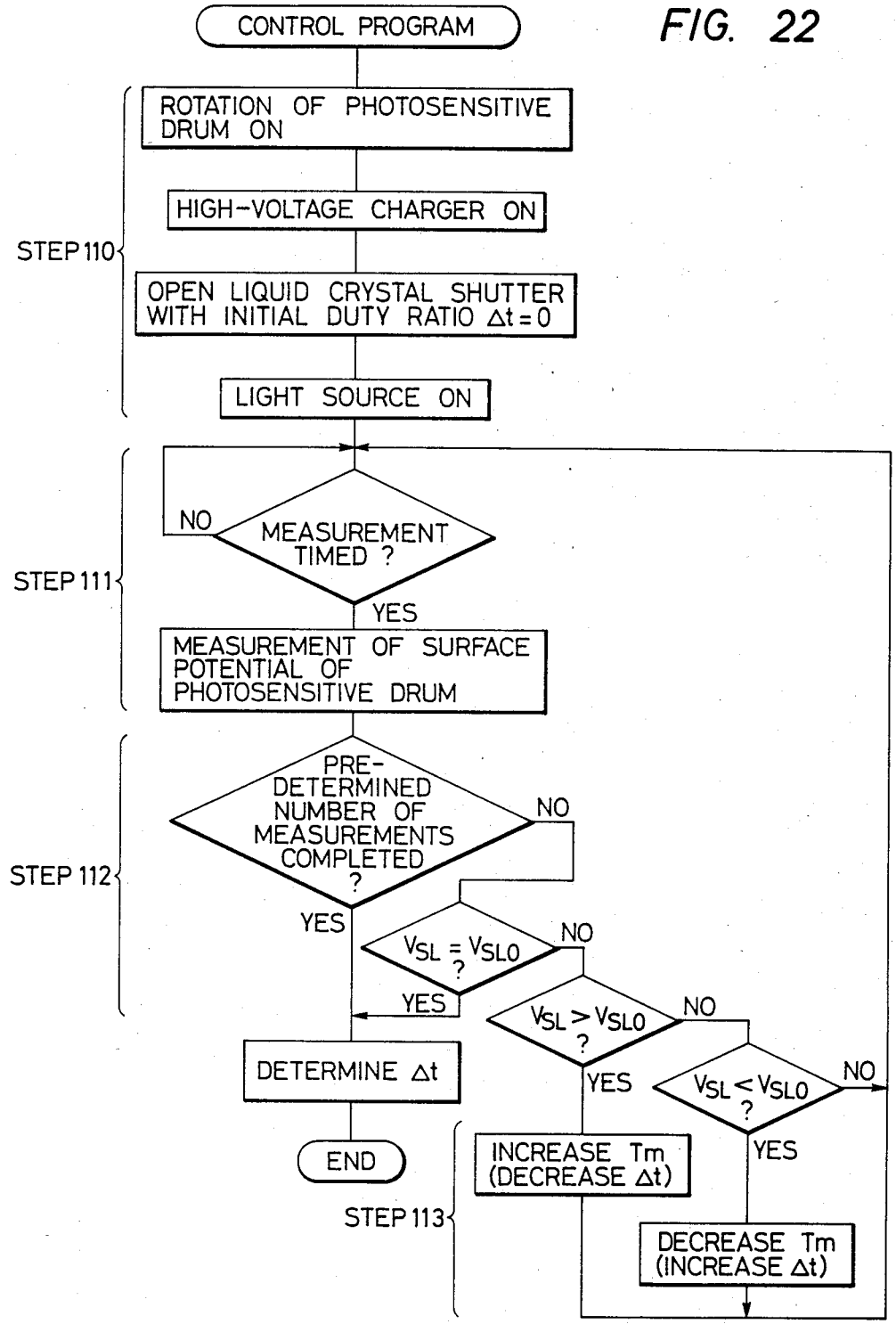
FIG. 22 is a flow chart of duty ratio control.

FIG. 22 shows a flow chart of the above duty ratio control.

Since FIG. 22 corresponds to FIGS. 11 and 17, steps in FIG. 22 are numbered using the same numbers as used in FIGS. 11 and 17.

At the step 113, if $V_{SL} < V_{SLO}$, that is, overexposure is detected, for example, the voltage-ON time Tm for liquid crystal driving is decreased (pulse absence time Δt is increased) by the liquid crystal shutter array driving circuit 208. Thereby the duty ratio is decreased and therefore the quantity of exposure is decreased.

As readily understood from the foregoing, the image-processing apparatus according to the invention can always produce good images. In the apparatus, the liquid crystal shutter driving signal is controlled to attain proper exposure value according to the conditions of the apparatus. As shown in the above embodiments, the necessary control can be performed by controlling the frequency (period), amplitude or duty ratio of the driving signal.

According to a further embodiment, the control is realized by controlling the output of the high-voltage transformer 1 shown in FIG. 1. This embodiment will hereinafter be described in detail.

In the case of this embodiment, the liquid crystal shutter array driving circuit 208 is omitted from FIG. 1 for the sake of explanation.

When the photosensitive drum is exposed to light with the liquid crystal shutter 16 fully open (the above-mentioned duty ratio is 100%), the drum must normally have the surface potential of $V_{SLO}$ as shown in FIG. 6. By the way it is to be understood that it is not always necessary to keep the liquid crystal shutter fully opened and it may be kept at any constant opening value. After the above exposure, however, there may be such case where the surface potential is not $V_{SLO}$ but $V_{SL}$ only. This is the case in which the surface potention on the drum could not, for some reason be decayed down to the normal level $V_{SLO}$ by the exposure. At any rate, this results in under-exposure. Therefore, in this case, it is required to increase the quantity of exposure. To this end, according to the present embodiment, the high-voltage output HV1 of the high-voltage transformer 1 is decreased and again the surface potential is measured. In this manner, the output HV1 of the high-voltage transformer is controlled to approach the target value $V_{SLO}$ while feeding back the measured potential to the high-voltage output HV1. This control of high-voltage transformer 1 is carried out through the surface potential control circuit (CPU) 3 to obtain good images.

Figure 23:
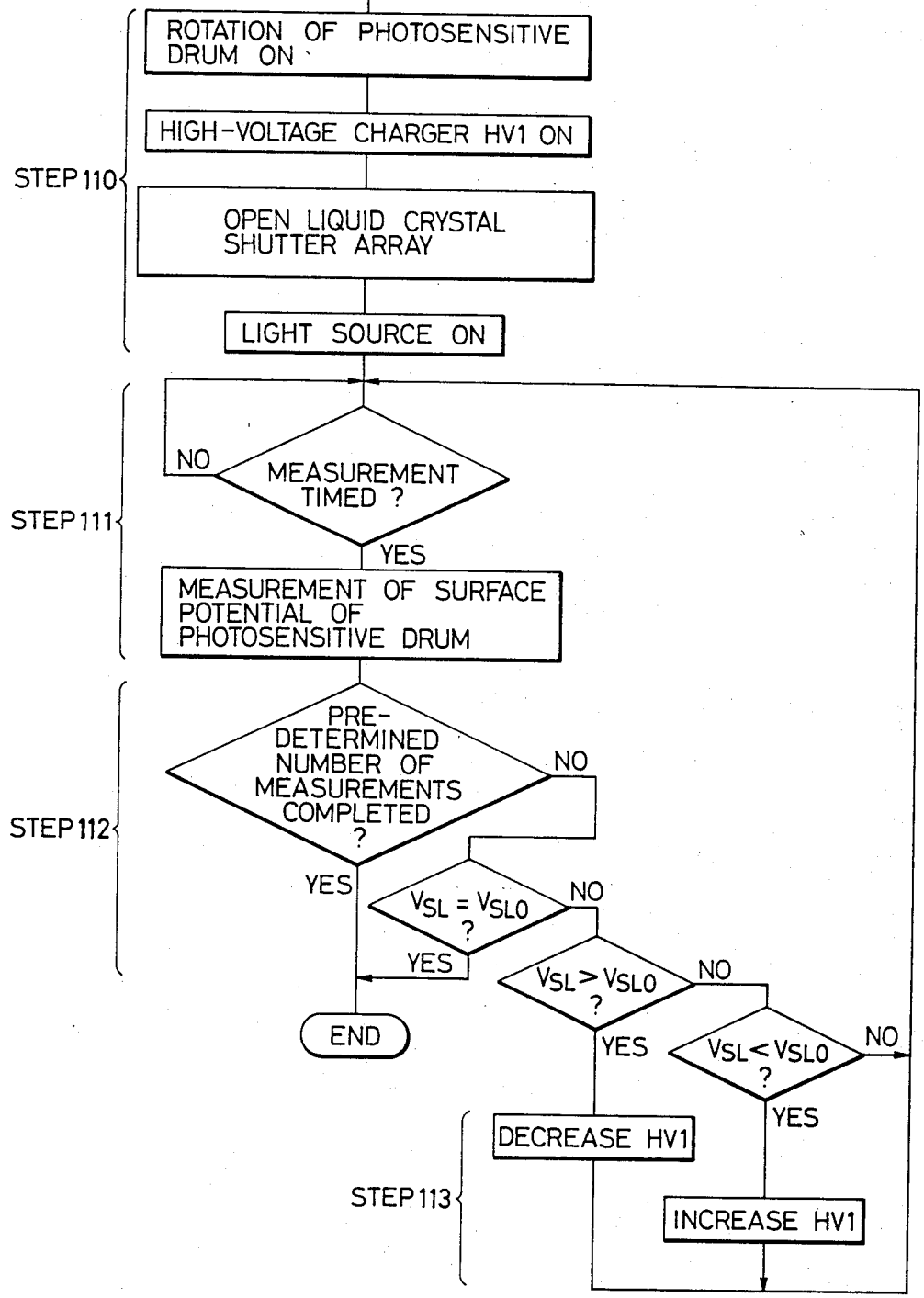
FIG. 23 is a flow chart of high voltage output control by the surface potential control circuit (CPU) to obtain a proper image.

FIG. 23 shows a flow chart of the high-voltage control.

At step 110 of the flow chart, the photosensitive drum 5 shown in FIG. 1 is exposed with the light source 7.

At step 111 the surface potential is measured after waiting a measurement timing. The measurement timing corresponds to the angle $\theta$ from exposure point to measurement point in FIG. 1. This is applied also to measurement after the control of high-voltage output HV1 at step 113.

At step 112 it is verified whether a predetermined number of measurements (for example, four measurements) have been completed. If yes, the rotation of drum for control is terminated. The drum rotation for control is terminated also when the measured surface potential $V_{SL}$ is in coincidence with the target value $V_{SLO}$. On the contrary, if the measured value and the target value do not meet each other, the next step 113 is executed.

At step 113, if $V_{SL} > V_{SLO}$, that is, if the measured surface potential is higher than the target surface potential, which means an underexposure, then the high-voltage output HV1 is decreased so as to make the measured value approaching the target value. If $V_{SL} < V_{SLO}$, which means an overexposure, then the high-voltage output HV1 is increased up so as to make the measured value approaching the target $V_{SLO}$.

FIG. 24 shows a circuit for controlling the high-voltage of the high-voltage charger 6.

In this figure, 23 is a voltage follower circuit, 24 is a differential amplifier circuit, 25 is a current amplifier circuit, 21 is a micro-computer and 22 is a D/A converter. The micro-computer 21 and D/A converter 22 are part of the surface potential control circuit (CPU) 3. A signal for controlling high-voltage current iH is applied to the converter 22 from the micro-computer 21. An example of a D/A converter is shown in FIG. 25.

When a signal whose pulse width changes is applied to the input of the converter shown in FIG. 25, its output analogously changes. This change is owing to the quantity of charge on the capacitor C. The magnitude of the output from the D/A converter 22 is determined depending on the information on data bus. With the increase of the output of D/A converter 22, the voltage at the inversion input terminal of the differential amplifier 24 also becomes larger and the output of the amplifier becomes smaller. Thereby the output of the current amplifier 25 is decreased down and therefore the output of the high-voltage transformer T1 is decreased. Thus, the high-voltage current iH is controlled in the direction to decrease.

On the contrary, when the output of D/A converter becomes smaller, the high-voltage current iH becomes larger.

The control of surface potential can be realized also by controlling the intensity of light to the photosensitive drum. Such an embodiment will hereinafter be described.

As previously described, the photosensitive drum must normally have a surface potential of $V_{SLO}$ (see FIG. 6) when it is irradiated by light with the liquid crystal shutter fully open (as previously noted, it is not always necessary to fully open the liquid crystal shutter). But, there may be such case where the surface potential for some reason does not drop to $V_{SLO}$ but only to $V_{SL}$ as shown in FIG. 6. This results in underexposure. In this case, a control is required to attain the target potential $V_{SLO}$. According to the present embodiment, it is attained by controlling the light intensity. When $V_{SL} > V_{SLO}$, the light intensity is increased so as to make the measured potential $V_{SL}$ approaching the target value $V_{SLO}$. On the contrary, if $V_{SL} < V_{SLO}$, then the light intensity is decreased so as to make the measured value $V_{SL}$ approach the target value $V_{SLO}$.

FIG. 26 is a block diagram of the image formation system of an optical printer including a light intensity control circuit.

Designated by 17 is the light intensity control circuit. VLiNT denotes a light intensity control signal. Other parts of the apparatus correspond to those of the apparatus shown in FIG. 1 and therefore need not be further described.

Figure 27:
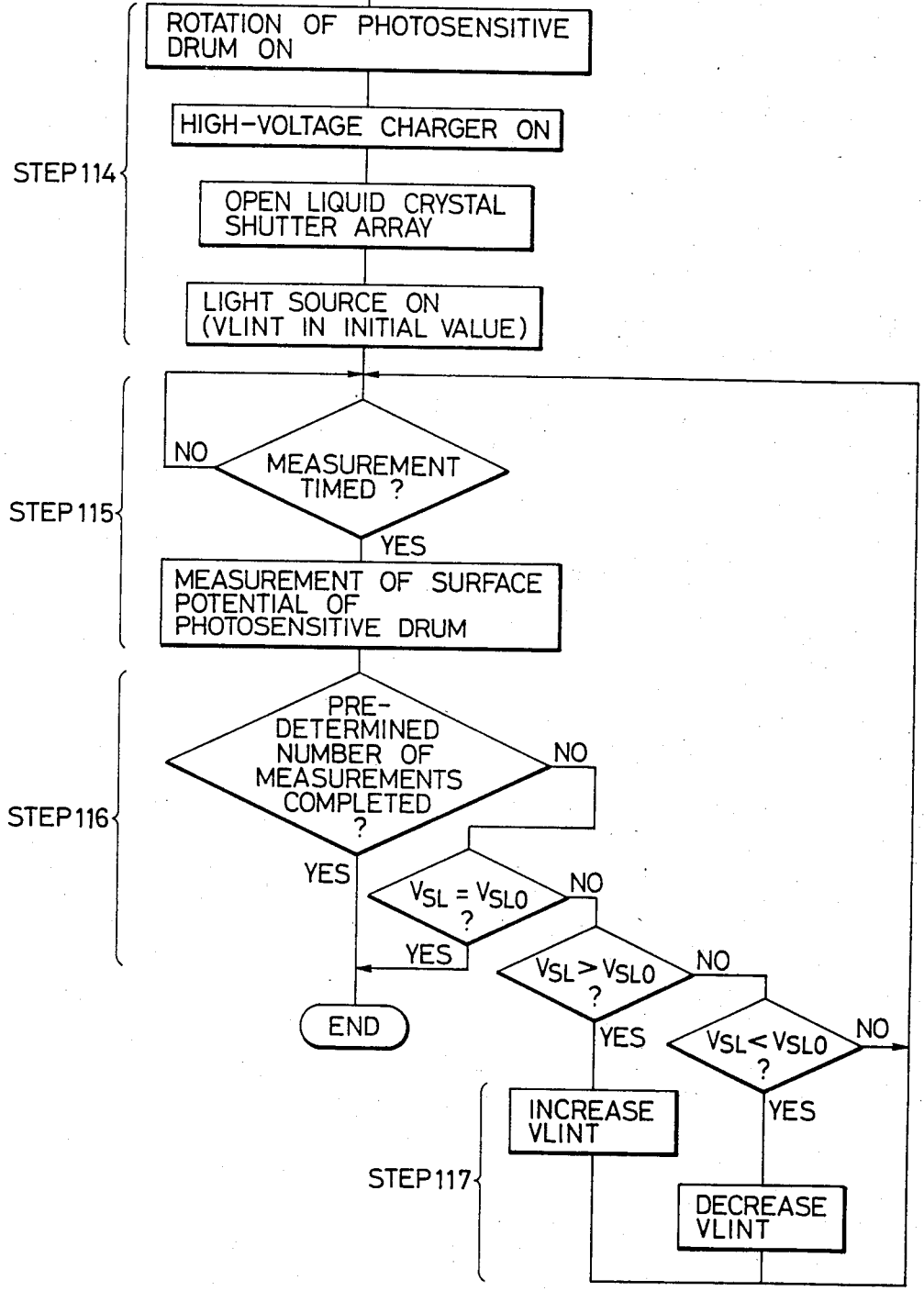
FIG. 27 is a flow chart of light quantity control by the surface potential control circuit (CPU) to obtain a proper image.

FIG. 27 shows a flow chart of the light intensity control by the surface potential control circuit (CPU) to obtain properly exposed images.

At step 114, the photosensitive drum 5 is rotated for control and exposed with the light source.

At step 115 the surface potential on the drum is measured after waiting the measurement timing. The measurement timing time corresponds to the angle θ from exposure point to measurement point in FIG. 26. This is applied also to measurement after the light intensity of the light source at step 117.

At step 116 it is verified whether a predetermined number of measurements (for example, the surface potential measurement is repeated four times) have been completed. If Yes, the drum rotation for control is terminated. The drum rotation for control is terminated also when the measured value $V_{SL}$ is in coincidence with the target value $V_{SLO}$. If the measured potential does not meet the target value, then the next step 117 is executed.

At step 117, if $V_{SL} > V_{SLO}$, that is, if the measured potential is higher than the target potential, which means underexposure, then the light intensity control signal (VLiNT) is increased up to increase the intensity of light thereby attaining the target potential $V_{SLO}$. On the contrary, if $V_{SL} < V_{SLO}$, the control signal VLiNT is decreased down so as to make the measured potential $V_{SL}$ approaching the target value $V_{SLO}$.

Figure 28:
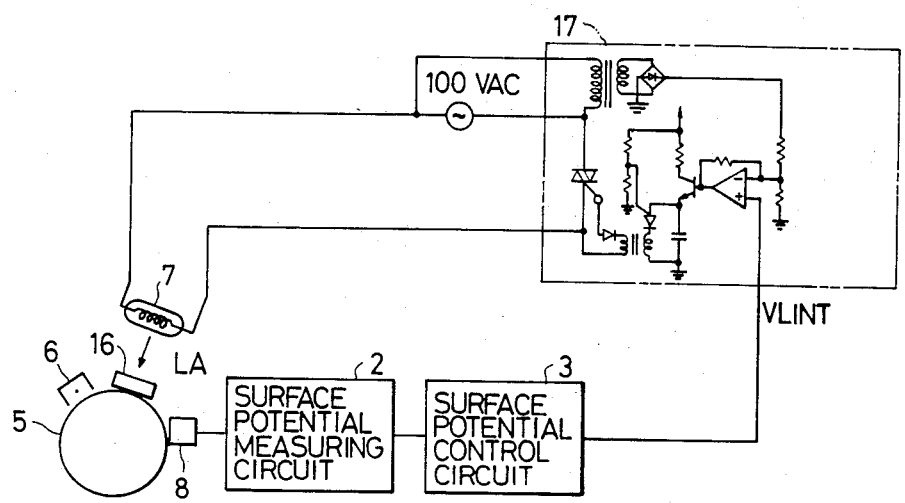
FIG. 28 shows a form of the light quantity control circuit.

FIG. 28 shows a form of the light intensity control circuit. This example is for the light intensity control of lamp 7 by AC 100 V.

Figure 29:
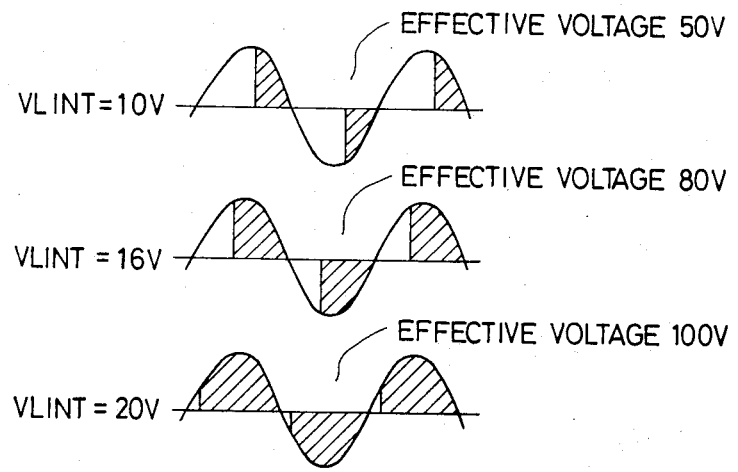
FIG. 29 shows an example of the operating waveform of the light quantity control circuit 17.

The light intensity control circuit 17 shown in FIGS. 26 and 28 receives VLiNT signal from the potential control circuit (CPU) 3. According to the level of the received signal VLiNT, the light intensity control circuit 17 controls the supply voltage to the lamp 7. It also carries out a phase control to keep constant the supply voltage to the lamp even when any variation occurs in source voltage. Other parts of FIG. 28 including the photosensitive drum 5 correspond to those of FIGS. 1 and 26 and need not be further described. An example of the operating waveform of the light intensity control circuit 17 is shown in FIG. 29 wherein the supply voltage is AC 100 V. For example, in the case of VLiNT=10 V, the effective voltage is 50 V. In the case of VLiNT=20 V, the effective voltage is 100 V as the result of the control. In FIG. 29, the hatched portion represents the supplied portion.

Figure 30:
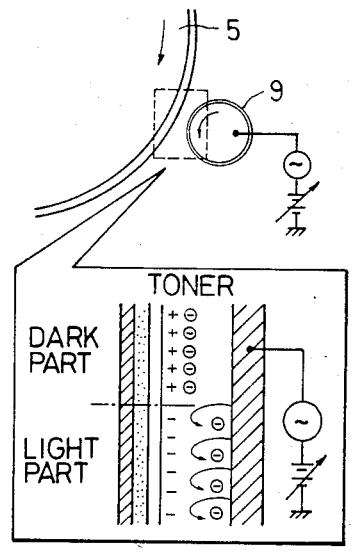
FIG. 30 schematically shows the distribution of toner on the photosensitive drum 5 under the action of the developing cylinder 9.
Figure 31:
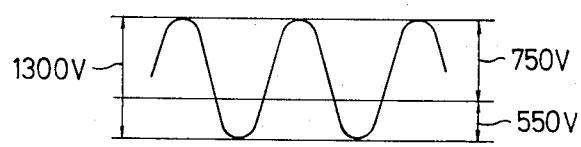
FIG. 31 shows the waveform of the voltage applied to the developing cylinder.

A further embodiment of the invention will hereinafter be described with reference to FIGS. 30 to 32.

When an electrostatic latent image on the photosensitive drum 5 and toner on the developing cylinder come close to each other, the toner transfer and adheres onto the drum surface according to the level of the surface potential on the drum. As the result of it the electrostatic latent image on the drum surface is developed into a visible toner image. This behaviour of toner between drum 5 and cylinder 9 is illustrated in FIG. 30. On the developing cylinder 9 there is applied a combination of AC+DC. FIG. 31 shows an example of AC+DC applied to the developing cylinder.

AC component is about 1300 Vp-p. As DC component $V_{DB}$=100 V is added to the AC component. The function of the added DC component is to attract the toner on the light part of the drum by DC component bias thereby preventing the image from being fogged, thus assuring stable development.

Figure 32:
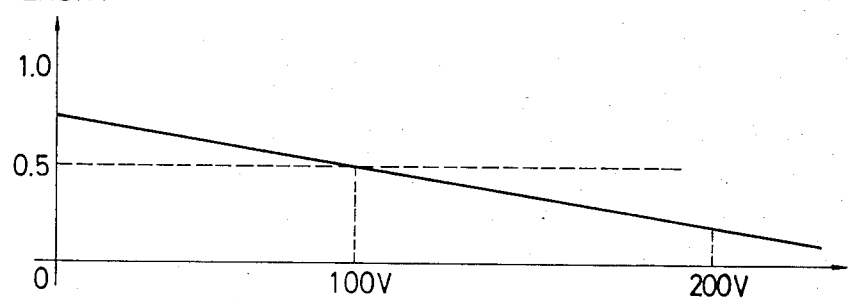
FIG. 32 is a relation curve between $V_{DB}$ of DC component and original intensity.

FIG. 32 is a relation curve between $V_{DB}$ of DC component and original intensity. In the case shown in FIG. 32, the proper original intensity, 0.5 is obtained when DC component $V_{DB}$=100 V. Under this condition, if $V_{DB}$ is increased, then there will be obtained a less fogged, thin image. On the contrary, if the DC component is decreased to $V_{DB}$=0, then there will be produced a much fogged, thick image. Therefore it is possible to obtain better images by suitably controlling the DC component of the developing bias according to a flow chart of control (not shown) similar to the above.

In this case, according to the kind of liquid crystal, there may be used an optical shutter which transmits light when a drive voltage is applied thereto. Also, as the optical shutter for color printer, there may be used a liquid crystal shutter. In the above, image-forming means has been controlled depending on the surface potential on the photosensitive drum 5. However, it is to be understood that image-forming means may be controlled directly by the light intensity of the lamp.

As readily understood from the foregoing, the image-forming apparatus provided with optical shutter according to the invention can always produce always good and stable images.

Hereinafter a further embodiment of the invention will be described with reference to FIGS. 33 to 41.

Figures 33, 34:
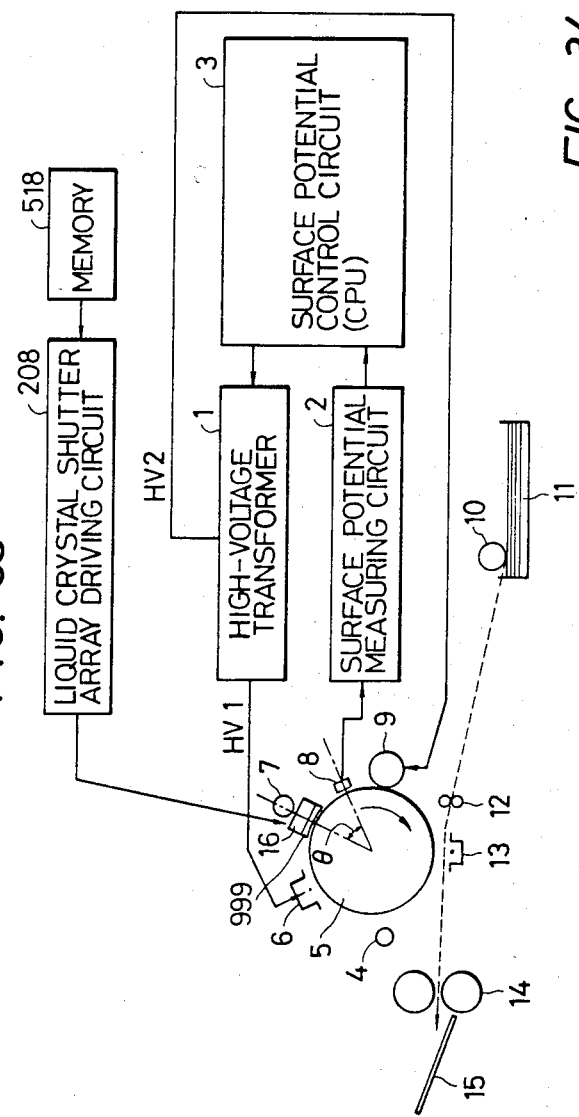
FIG. 33 is a block diagram of an image processor provided with an image memory.
FIG. 34 shows an example of a dither matrix.

FIG. 33 is a block diagram of an image-processing apparatus in which the present invention has been embodied. Like reference characters to those in FIGS. 1 and 26 represent the same corresponding parts. Designated by 518 is a memory or a host computer containing image data stored therein.

The present invention will be described in connection with the processing of halftone images by such apparatus.

Figure 35:
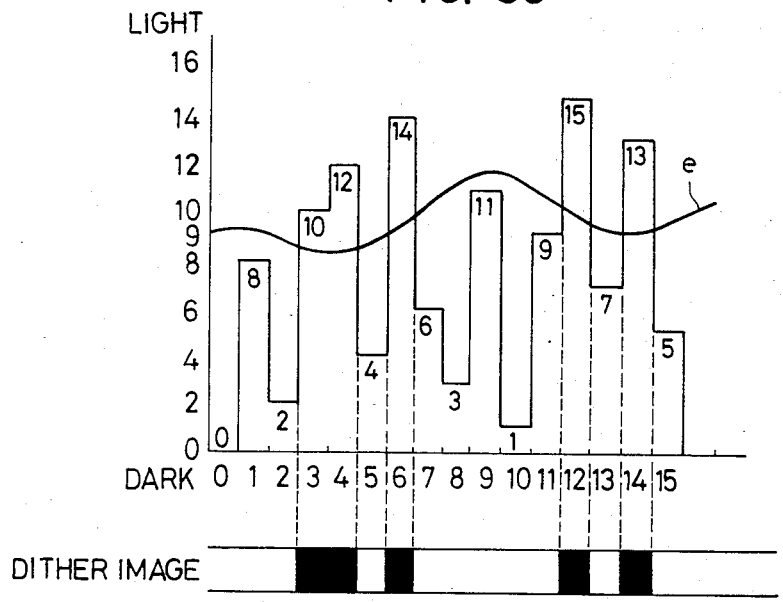
FIG. 35 shows ON-OFF of a half-tone image in pattern.

The method generally used to reproduce halftone is the dither process. According to the dither method, threshold values are preset to image signals or other similar signals in accordance with a dither matrix as shown in FIG. 34. ON-OFF of a cell is determined by the preset threshold value. FIG. 35 shows a halftone image ON-OFF pattern using the 4×4 dither matrix. In FIG. 35, e represents the level of the halftone image. By the ON-OFF of each picture element using the dither processed pattern, a halftone image can be reproduced analogously. But it is impossible or very difficult to reproduce a high-quality halftone by digital ON-OFF. As a solution to it, there has been proposed so-called multi-digitalized dither process. An example of this process is the ternary dither process which is illustrated in FIG. 36.

FIG. 36-a shows an example of input picture signals. For the picture signals, according to the ternary dither method, two dither matrixes are prepared which are a first dither matrix as shown in FIG. 36-b and a second dither matrix as shown in FIG. 36-c. The picture signal level of the corresponding picture element is compared with the first and second dither matrixes. When the signal level is lower than the first dither matrix, the picture signal is determined to be white (○). If the signal level lies between the first and second dither matrixes, then the picture signal is determined to be gray (◐). When the signal level is higher than the second dither matrix, the picture signal is determined to be black (●). FIG. 36-d shows the result of such determinations. These signals determined in this manner can be treated as digital signals after a ternary→binary conversion. Let white, gray, black each be a ternary signal 0, 1, 2. Then, the ternary signal can be converted into 0, 1 binary signal as 0→00, 1→01, 2→11. Thus, after the conversion, it is possible to process the picture signals as digital signals. These data are stored in the memory 518 in FIG. 33. The liquid crystal shutter array driving circuit 208 drives the liquid crystal shutter array 16 in accordance with the output from the memory 518.

As described above, with the multi-digitalization of dither process, depth has been given to every picture element. According to the present embodiment, halftone images are reproduced by controlling the transmittance to light of the liquid crystal shutter.

FIG. 37 shows drive waveforms used for representing halftone by the amplitude-control of the drive waveform of the liquid.

Figure 38:
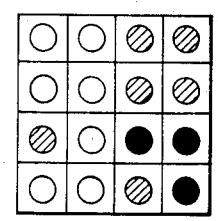
FIG. 38 illustrates the manner of reproduction of half-tones.

In FIG. 37, at the section D a waveform is applied to the separate electrode 603. When the applied waveform has an amplitude of ½ V and is in-phase to the waveform applied to the common electrode 601, a signal of amplitude ½ V appears at the liquid crystal shutter part 607 and also a signal of amplitude 3/2 V appears at the liquid crystal shutter part 608. Similarly, at the section E also a signal of amplitude ½ V appears at the liquid crystal shutter 608. By presetting the threshold for light-ON Vth to a value of Vth<½ V, therefore, the reproduction of halftone of 50% transmittance (see FIG. 5, Vh) can be attained. FIG. 38 shows the manner of such halftone reproduction. Like the above, ■ in FIG. 38 represents black, ▨ represents gray and □ represents white.

Figure 39:
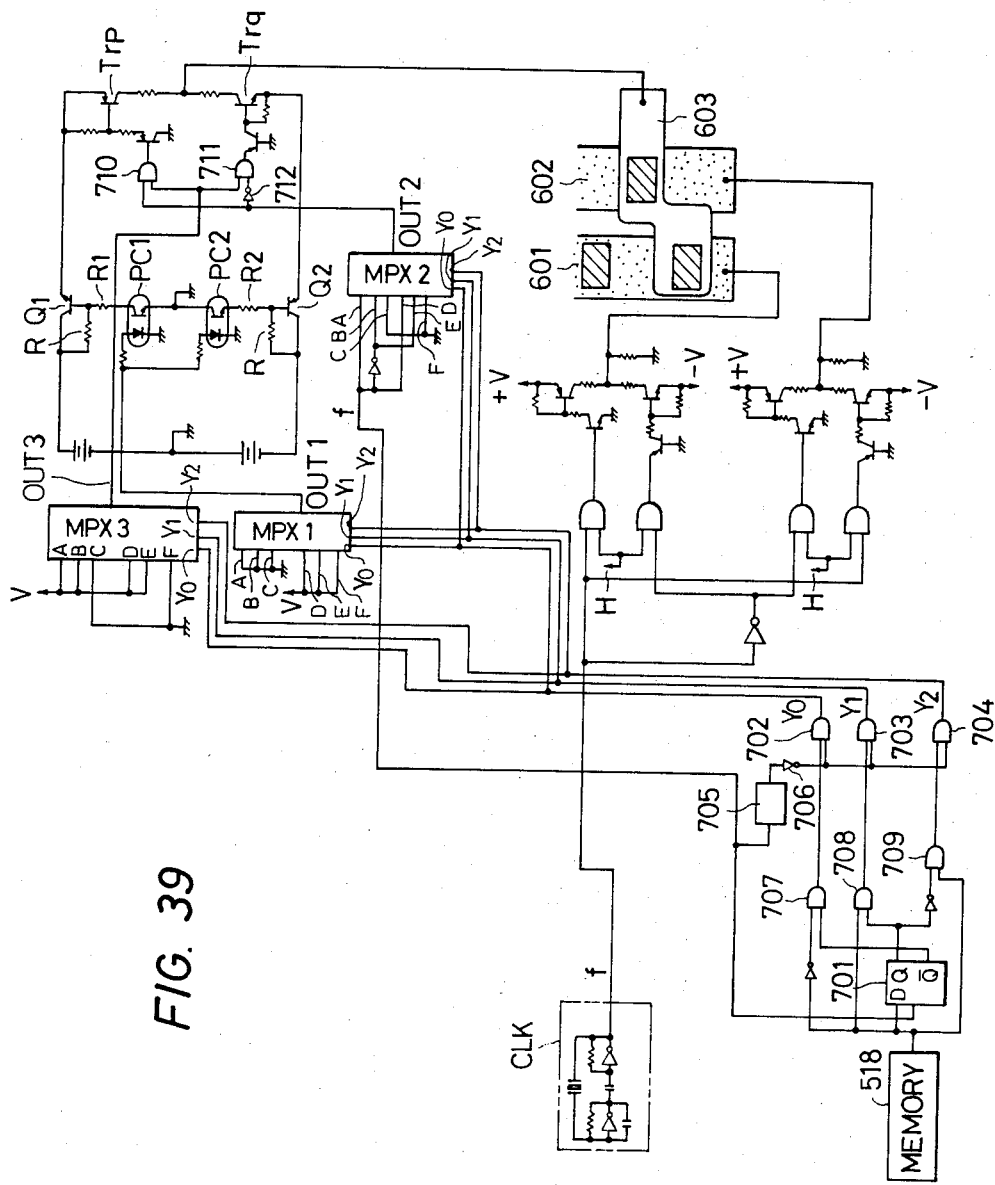
FIG. 39 is a detailed circuit diagram of the liquid crystal shutter array driving circuit 208 for amplitude control.

FIG. 39 is a detailed circuit diagram of the liquid crystal shutter array driving circuit 208 by which the amplitude control is carried out to reproduce the above-mentioned halftone. In this embodiment, as seen from FIG. 37, the amplitudes of the drive waveforms applied to the common electrodes 601 and 602 are not changed but kept constant. Therefore, the details of the driving circuit part for the common electrodes 601 and 602 need not be described.

Figures 40, 41:
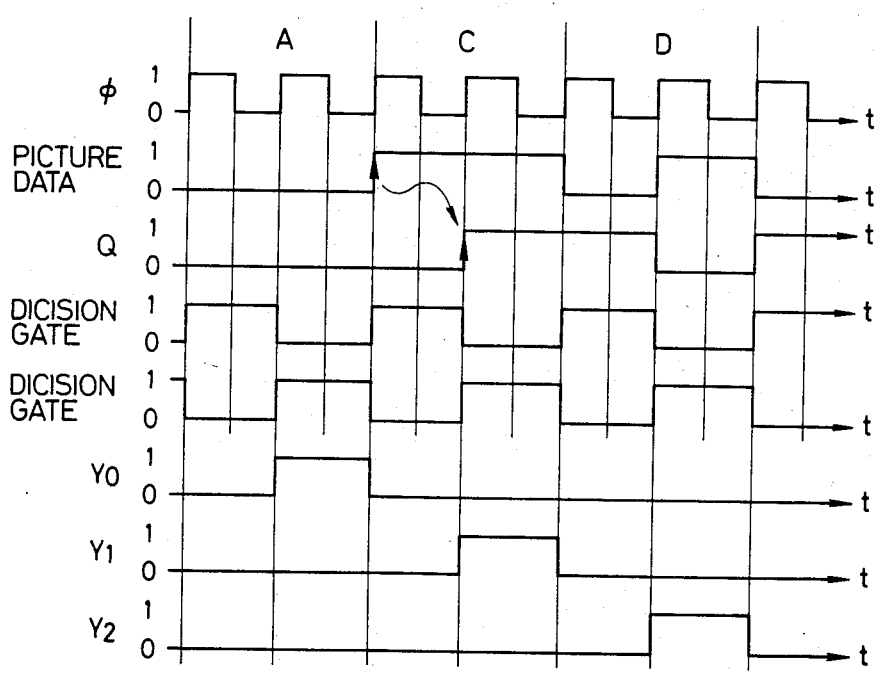
FIG. 40 shows white, black and gray discrimination output signals.
FIG. 41 is a timing chart of the output signals.

518 is the memory as previously shown in FIG. 33 in which picture data and other data are stored. White, gray and black are stored therein as "00", "01" and "11" so that one picture element can be represented by two bits. From the data stored in the memory 518, white, gray, black are decided by gate or other means and the amplitude of the separate electrode 603 is controlled by multiplexers MPX1, MPX2, MPX3. Output signals of white, black, gray decided by gate or other means are shown in FIG. 40. As shown in the figure, white is represented by Yo, Y1, Y2 being 1, 0, 0 respectively. Herein, Yo, Y1, Y2 are output signals from the gates shown in FIG. 39. The output (out) of the multiplexer (MPX) is determined by this combination of Yo, Y1, Y2. The multiplexers will be described in detail later.

The manner of decision of white, black, gray necessary for the generation of the output signals Yo, Y1, Y2 will be described with reference to FIG. 41 which is a time chart of the decision.

In FIG. 41, $\phi$ is a clock signal (frequency f). A, C and D correspond to A, C and D in FIG. 40. Picture data are 0, 0 at section A; 1, 1 at section C and 0, 1 at section D. Q is the output of the flip-flop 701 shown in FIG. 39. Compared with the picture data, the output of the flip-flop has a clock of delay. CLK in FIG. 39 is a clock circuit. The outputs Yo, Y1, Y2 are generated when AND of the picture data and the output of the flip-flop 701 is made by gates 707, 708, 709 during the time of gates 702, 703, 704 being opened by ½ frequency divider 705 and inverter 706.

In the circuit shown in FIG. 39, the amplitude control of the drive waveform for the separate electrode 603 is carried out in the following manner:

The above-mentioned output signals Yo, Y1, Y2 are input to multiplexers MPX1, MPX2, MPX3 the outputs of which are designated by out1, out2, out3 respectively. As shown in FIG. 40, the multiplexer whose inputs Yo, Y1, Y2 are 1, 0, 0 generates an output of A. Referring to FIG. 39, the A terminal of multiplexer MPX1 is ground. Therefore, out1 is 0 output. MPX3 generates V output by which the gates 710 and 711 are opened. At the A of MPX2 the data from the memory 518 is generated out as it came in. Since the gates 710 and 711 are open, transistor Trp or Trq is rendered conductive. Thus, a drive signal the amplitude of which has not been changed is applied to the separate electrode.

In case that the picture signal is black, that is, Yo, Y1, Y2 and 0, 1, 0, the multiplexer's output is C. That is to say, the outputs of multiplexers MPX1, MPX2, MPX3 are all 0. As the output of MPX3 is 0, the gates 710 and 711 remain closed. Consequently the applied drive signal to the separate electrode 603 is 0. However, as shown in FIG. 37, at section C, the liquid crystal shutter array 16 becomes black owing to the potential difference between the two common electrodes.

In the case of gray, the output of multiplexers is D. More particularly, MPX2 has 0 output, and MPX1 and MPX3 each have V output (ON). As MPX3 is ON, the gate 71 is opened through inverter 712 and therefore the transistor Trq is also rendered conductive. However, because of MPX1 being ON, a photo coupler PC1 or PC2 is turned ON so that the potential decreases by R1 or R2 to change the amplitude of the outputs of transistors Q1, Q2. In the case of this embodiment, the change is ½ in amplitude.

In the manner described above, drive waveforms to the separate electrode 603 are controlled in accordance with the combinations as shown in FIGS. 37 and 38. For example, at section F where the output of multiplexer MPX3 is 0, the liquid crystal shutter array is black as at section C.

While the control of the amplitude of separate electrode has been particularly shown and described, it is also possible to control the amplitude of common electrodes in the manner similar to above. If the amplitude is continuously variable, it is also possible to output images of analog signals other than dither process as they are input. This is applicable also to the controls of frequency, duty ratio etc.

Figure 42:
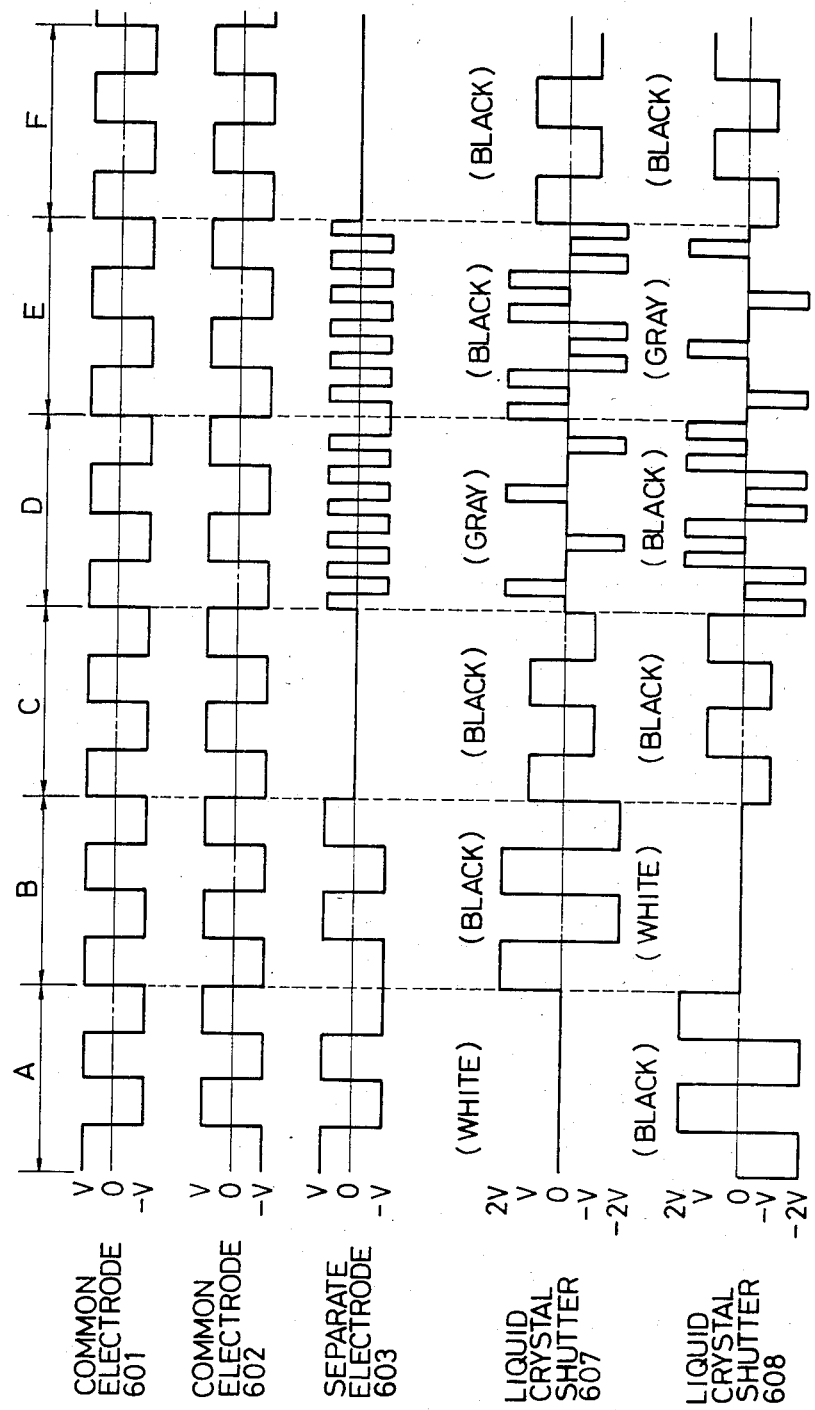
FIG. 42 shows frequency-controlled driving waveforms.

A still further embodiment of the invention will hereinafter be described with reference to FIGS. 42 and 43.

As previously described in connection to FIG. 5, the transmittance curve shifts to the dotted line portion from the solid line portion in FIG. 5 when the drive frequency is increased. In other words, the state of the liquid crystal shutter changes from the state for light-cutoff to that for light transmission with increasing the frequency. More concretely, it changes from black to gray and further to white with the increase of drive frequency. The embodiment now being described makes use of this phenomenon for the reproduction of halftones. In order to represent halftones the transmittance of the liquid crystal shutter is suitably controlled by controlling the frequency of the shutter drive waveform. FIG. 42 shows drive waveforms frequency-controlled to realize such halftone reproduction. FIG. 43 shows a frequency control circuit for the liquid crystal shutter array 16. In this embodiment, the drive frequency of the separate electrode 603 only is controlled. Therefore, the circuit part for driving the common electrodes 601, 602 need not be described.

Figure 43:
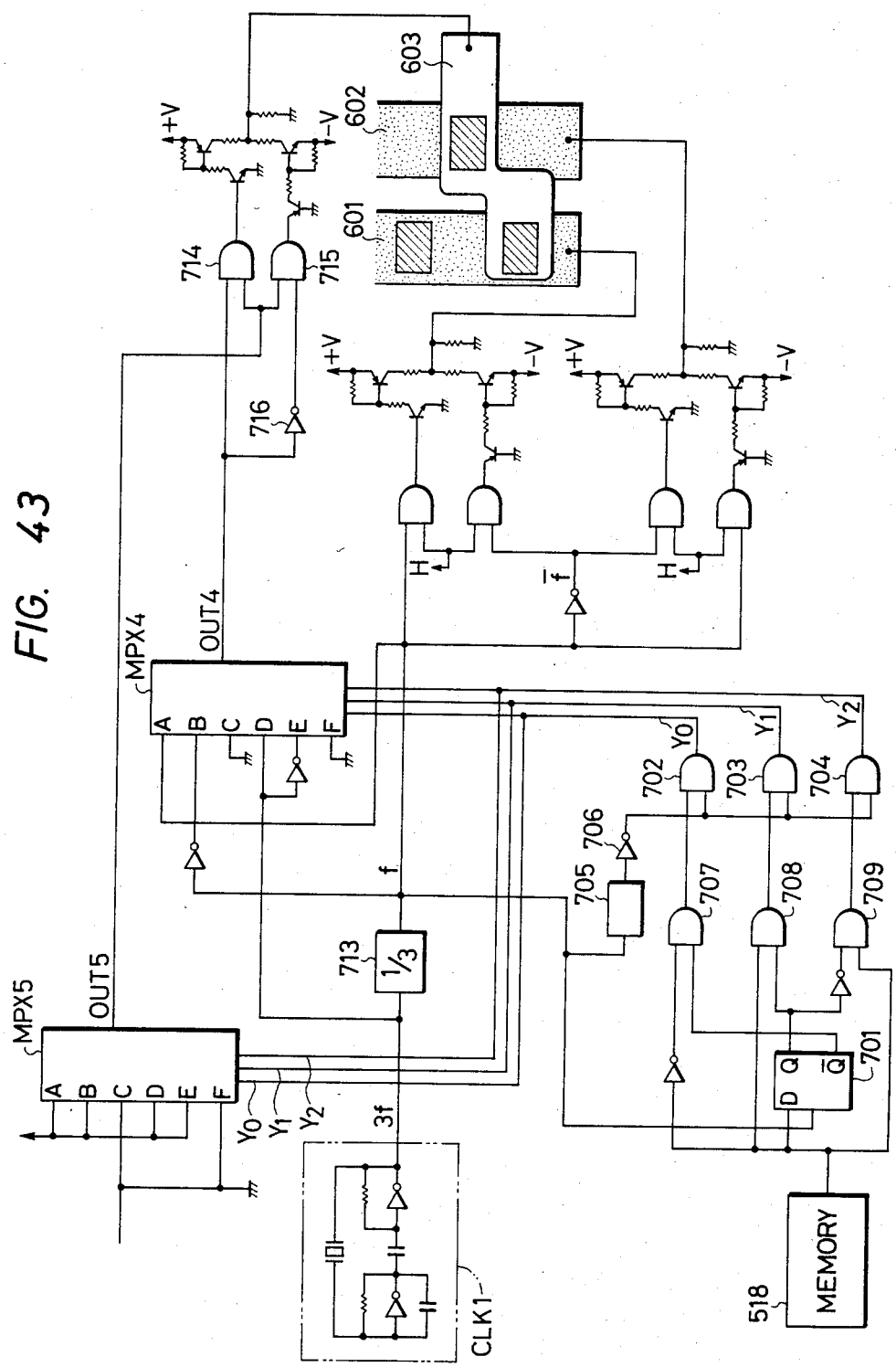
FIG. 43 shows a frequency control circuit of the liquid crystal array 16.

Referring to FIG. 43, white, black, gray decision signals Yo, Y1, Y2 are introduced into multiplexers MPX4 and MPX5 like the above embodiment shown in FIG. 39. 713 is a ⅓ frequency divider and CLK1 is a 3f clock circuit. Since the present embodiment corresponds to the above embodiment in the function of multiplexer, the reference characters A, B, C, D, E, F used in FIGS. 40 and 41 are also used in FIGS. 42 and 43.

When Yo, Y1, Y2 are 1, 0, 0, that is, when the picture signal is white (see FIG. 40), the output out5 of the multiplexer MPX5 is A while the output out4 of MPX4 is A. Consequently, the gates 714 and 715 are opened and closed at frequency f by the inverter 716 so that there is applied to the separate electrode 603 a driving signal whose phase is the same as that of the common electrode 601.

When Yo, Y1, Y2 are 0, 1, 0, the output is C as seen from FIG. 40. Therefore, the output out5 of MPX5 is 0. The gates 714 and 715 are closed. The drive waveform of the separate electrode 603 remains 0 V.

When Yo, Y1, Y2 are 0, 0, 1 the output is D from FIG. 40. Therefore, the output out4 of MPX4 is the 3f signal from CLK1. The output out5 of MPX5 is high level by which the gates 714 and 715 are opened so that an output signal having three times higher frequency is applied to the separate electrode 603. The drive waveform to the liquid crystal shutter array at this section D is seen in FIG. 42, at section D.

As understood from the above, according to this embodiment, it is possible to represent gray in addition to black and white by controlling the frequency of the applied waveform to the separate electrode 603.

The same object may be attained also by controlling the frequency or amplitude of the common electrode instead of the separate electrode. Also, instead of frequency or amplitude, duty ratio, light intensity or high-voltage output may be controlled for the same purpose.

To obtain better images the control of frequency, amplitude etc. of the drive waveform for the liquid crystal shutter array 16 and driving circuit 208 may be carried at first by surface potential sensor 8, surface potential measuring circuit 2 and surface potential control circuit (CPU) during the pre-rotation for control.

The present invention is applicable also for data-writing in photo-magnetic recording medium and the like.

The present invention enables to provide image-processor such as optical printer which can reproduce even halftone and make stable quality images.

A further embodiment of the invention will hereinafter be described with reference to FIGS. 44 to 47.

Figure 44:
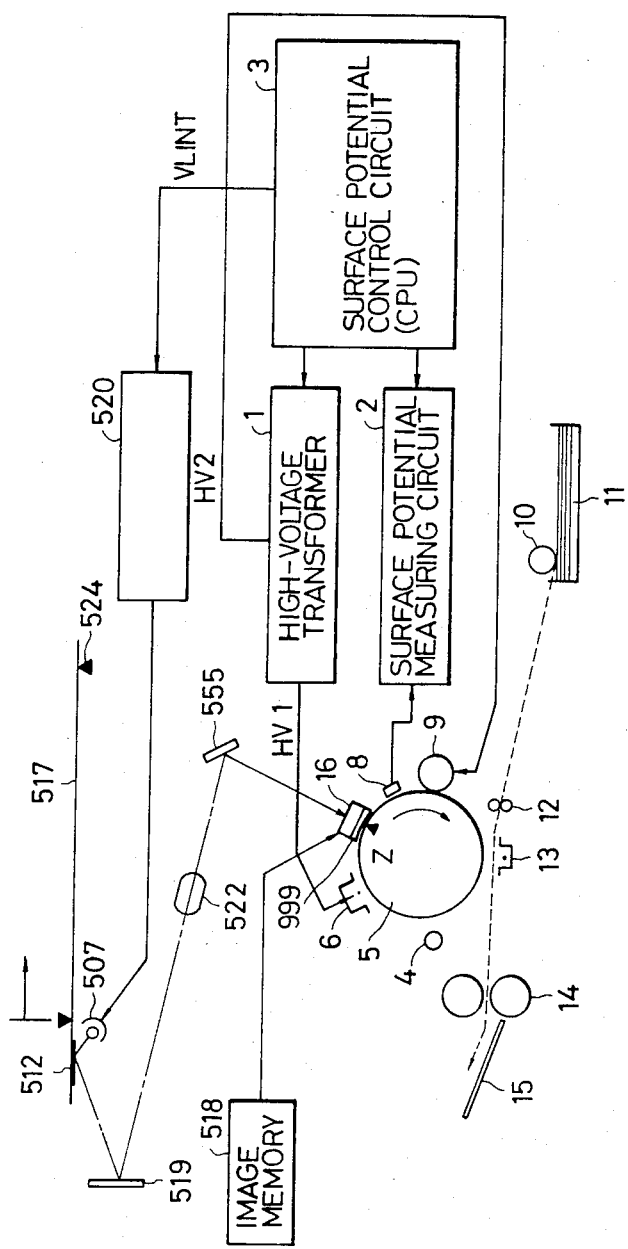
FIG. 44 is a block diagram of an image processor having two functions for image processing based on information from an original and for image processing based on information from a memory.

FIG. 44 is a block diagram of an image-processing apparatus in which the present invention has been embodied. In FIG. 44 like reference characters to FIGS. 1, 26, 33 represent the same or corresponding parts.

In this embodiment, the exposure of the photosensitive drum 5 can be carried out selectively using two different exposure systems I and II.

(I) The light from a light source is transmitted through and shut out by the liquid crystal shutter array 16 so as to form picture elements to which the photosensitive drum is exposed.

(II) Original is scanned using the same light source as above and an image of the scanned original is formed on the photosensitive drum 5 through the lens 522.

These two exposure systems can be switched over by the liquid crystal shutter array 16.

Figure 45:
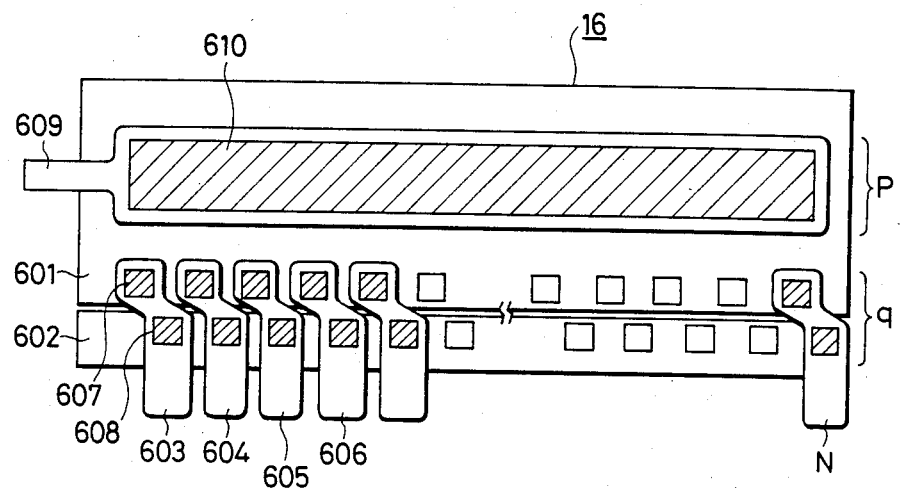

FIG. 45 shows the detailed structure of the liquid crystal shutter array 16.

In this figure, 601, 602 are common electrodes, 603, 604, 605, 606, 609 are separate electrodes and 607, 608, 610 are liquid crystal shutter portions. The liquid crystal shutter array 16 is composed two parts p and q. Such liquid crystal shutter array which is composed of only part q is widely used at present. It is generally called a zig-zag lattice arrangement. The liquid crystal material used in this embodiment transmits light only when no voltage is being applied to it. When voltage is applied, the liquid crystal material shuts out light. Of course, such material whose state changes oppositely to the above also can perform the function of a shutter.

Figure 46:
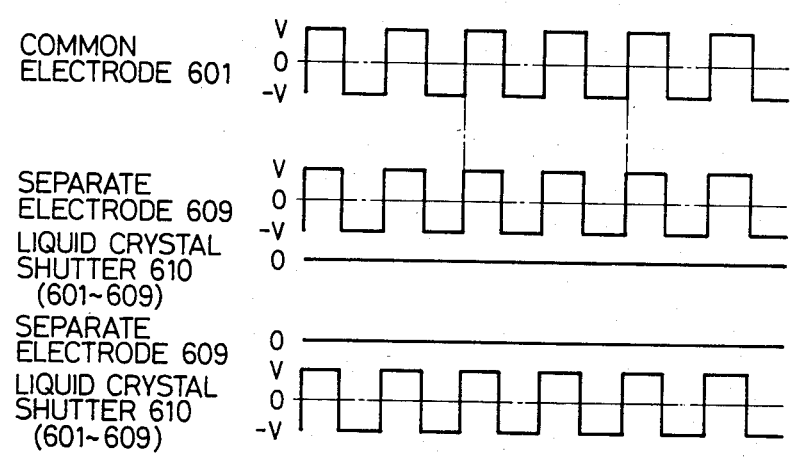
FIG. 46 shows the structure of the liquid crystal shutter array 16.

Signal waveforms to the part q have already been described with reference to FIG. 8 and therefore need not be further described. Drive waveforms to the liquid crystal shutter portion 610 in the part p as applied by the common electrode 601 and the separate electrode 609 are shown in FIG. 46.

When the exposure carried out through the exposure system (I), only the portion q of the liquid crystal shutter is used. The optical system 507 in FIG. 44 is not moved. The liquid crystal shutter 16 is illuminated by the light reflected by a white board through reflection mirror 519, lens 522 and reflector 555. The detailed structure and the manner of operation of the liquid crystal shutter 16 have already been described.

When the exposure is carried out through the exposure system (II), the optical system 507 is moved in the direction of the arrow to scan the original. The reflected light having an intensity corresponding to the original intensity is projected on the liquid crystal array 16 through reflection mirrors 519, 555 and lens 522. In the case of (II), all the part q in FIG. 46 is kept in the state for shutting the light out. Therefore, there is no transmission of light through the part q. The other part p is kept in the state for total transmission so that image formation by original scanning is possible. The necessary state of the liquid crystal shutter for this exposure can be realized by applying to the common electrode 601 and the separate electrode 609 the same phase of voltage. In the case of this exposure (II), it is not always necessary for the light exposure on the photosensitive drum 5 to be carried out through the liquid crystal shutter 16.

By the exposure described above, a latent image is formed.

The apparatus shown in FIG. 44 is further provided with the function to control the surface potential for obtaining good images with proper exposure value. To this end, the surface potential is measured by the surface potential sensor 8 and the light intensity of the light source 507 is controlled by the light intensity control circuit 520 according to the measured surface potential. The same purpose may be attained also by controlling the high-voltage HV1 of the high-voltage charger 6 or by controlling the developing bias. Further, it may be attained by controlling the amplitude, period (frequency) or duty ratio of the drive waveform to the liquid crystal shutter array 16. Furthermore, the control for obtaining good images may be realized by directly detecting the light intensity. Also, a method for multi-digitalization of color may be employed. These control methods do not directly relate to the present embodiment and therefore need not be further described.

Figure 47:
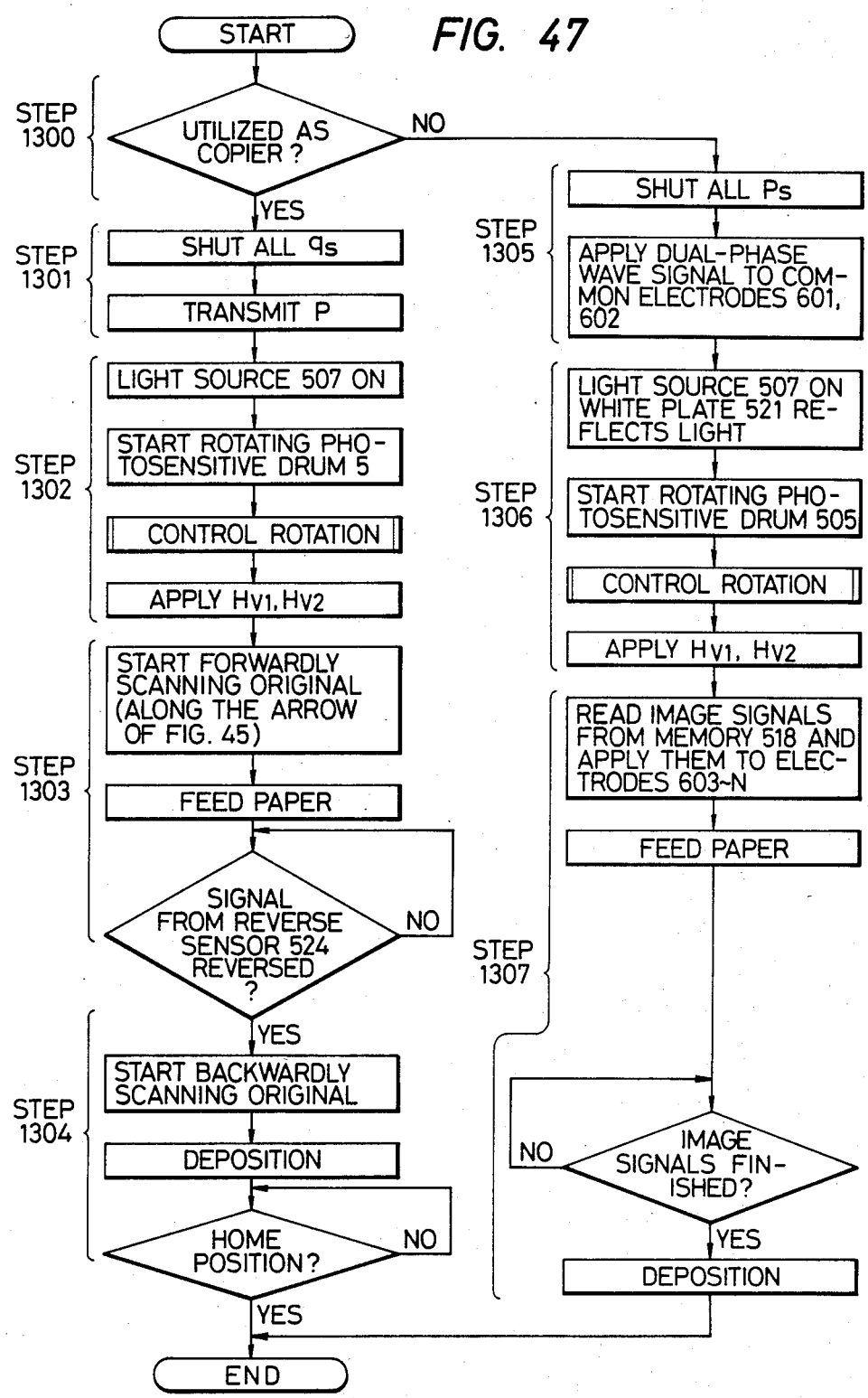
FIG. 47 is a sequence flow chart of the image processor.

FIG. 47 is a flow chart of the total sequence for the image-forming apparatus according to the present invention.

After the start of the apparatus, it is verified whether the apparatus is utilized as copier or as printer at step 1300. When the apparatus is utilized as copier, the process is advanced to step 1301. At the step 1301, the selection of part p "transmission"-part q "shut" mode is made for the liquid crystal shutter array 16.

At step 1302 the control rotation routine is called to turn on the light source 507 and control the surface potential on the photosensitive drum. After determining the proper values of high voltages HV1 and HV2, the determined high voltages HV1 and HV2 are applied by the charger 6.

At step 1303 the light source 507 is moved along the original in the direction of arrow for the scanning of the original. At the time, paper feed is also carried out while timing the paper feed to the drum rotation for registration as previously described.

At step 1304, a reverse sensor 524 detects the completion of scanning of all the surface of the original. When it is detected, the optical system including the light source 507 is moved back toward its home position. On the other hand, the toner image transferred onto a copy paper by the transfer device 13 is fixed by a fixing device and then the copy paper is discharged from the apparatus into a tray 15. When the optical system reaches the home position, one sequence of operations is ended.

When the apparatus is utilized not as copier but as printer, the sequence of operations is different from the above. In this case, the part p in FIG. 45 does not transmit light. Instead, only the formation of picture elements is carried out through the part q of the liquid crystal shutter array.

At step 1305, a dual-phase wave signal is applied to the common electrodes 601 and 602. The light source 507 is turned on. The light is reflected by the white board 521. The totally reflected, bright light is projected on the liquid crystal shutter through reflecting mirror 519, lens 522, reflecting mirror 555, liquid crystal shutter array 16 and condenser lens 999. Like the above sequence, the surface potential on the photosensitive drum 5 is carried out at step 1306. After that, step 1307 is executed.

At the step 1307, image signals are read out from the memory 518 and applied to the electrodes 603-N. Picture elements ae formed by repeating "transmission" and "shutoff" of the light by the liquid crystal shutter. Instead of the memory 518 there may be used also outputs transmitted from a computer as serial data.

When the formation of all the picture elements of a picture followed by the deposition of the copy paper is completed, one printer sequence is ended.

In this manner, the image-processing apparatus according to the invention can be utilized as a copier and also as a printer. Furthermore, stable quality images can be obtained by the apparatus.

Obviously various changes and modifications are possible in the embodiments described above.

For example, the image-forming apparatus may be provided with two separate photosensitive drums, light sources etc., one for printer and the other for copier. Also, to drive the liquid crystal shutter there may be used inputs from a keyboard, character generator or the like. While in the above embodiment the part p on one side and the part q on the other side of the liquid crystal shutter have been used separately from each other, the two parts may be used at the same time, for example, for writing a message from a keyboard or other input device while using two separate light sources. When the apparatus is utilized as copier, the liquid crystal shutter array may be retracted from the optical path between original and photosensitive drum.

The liquid crystal shutter shown in the above embodiments is of linear type. However it is to be understood that there may be used also a moving type of liquid crystal shutter having a very small length almost equal to the size of one picture element. In the case of linear type, it is possible to change magnification or to set line space by controlling the read-out of data from the memory or by controlling the photosensitive medium such as a rotary drum while counting the drive pulses. It is also possible to make a space between picture elements.

In the above embodiments, the liquid crystal has been shown to control the transmitted light intensity. However, if a liquid crystal shutter is provided on the reflection mirror 555 in FIG. 44, then the liquid crystal shutter can be used as that of reflection type.

As the memory there may be advantageously be used two buffer memories each having a capacity enough to store one print line of data. By doing so, data can be fed at high speed in synchronism with the speed of printing by the liquid crystal shutter. The input timing and the output timing of each the buffer memory can be switched over by a timing signal so that during storing data in the first buffer memory, data feed to the shutter from the second buffer memory can be carried and when the one line printing is completed, the output from the first buffer memory can be started simultaneously with the termination of the output from the second one. The timing signal may be a signal informing of the completion of exposure of shutter one line or the start of one line exposure (for example, a pulse generated when a predetermined number of shutter clocks are counted up or a reference pulse having a predetermined period by which one line period is determined). In synchronism with such timing pulse, the data input and output to and from each the buffer memory can be changed over.

It is therefore to be understood that within the scope of the appended claims, the invention may be practiced otherwise than as specifically described.

I claim:

1. Image processing apparatus comprising:
   placing means for placing an original thereon;
   a light source for exposing the original;
   image forming means for forming images on a recording member in response to light reflected by the original placed on said placing means;
   control means disposed in a path through which light is transmitted from said placing means to said recording member for controlling the amount of light transmitted therethrough to said recording member, wherein the light from said light source to said recording member passes through said control means only once;
   output means for providing an image signal to said control means; and
   means for switching the apparatus to a first mode for forming images in response to the original or to a second mode for forming images in response to an image signal provided by said output means, wherein in the first mode said control means allows reflected light from the original to be transmitted therethrough to said image forming means so as to form images in response to the original and in the second mode said control means controls the amount of light transmitted therethrough in response to an image signal generated by said output means so as to form images in response to the image signal.

2. Image processing apparatus according to claim 1, wherein said control means comprises a liquid crystal shutter and means for controlling said liquid crystal shutter.

3. Image processing apparatus according to claim 1, wherein said light source for exposing the original serves as a light source when the apparatus is in the second mode.

4. Image processing apparatus according to claim 1, further comprising a light source for exposing the original and a white plate, wherein light reflected by said white plate serves as a light source in the second mode.

5. Image processing apparatus according to claim 1, wherein said output means includes an image memory.

6. Image processing apparatus according to claim 1, wherein said control means is mounted near said recording member.

7. Image processing apparatus according to claim 1, wherein said control means comprises a plurality of lines of liquid crystal devices and said liquid crystal devices on each line are arranged in an array.

8. Image processing comprising:
   image forming means for forming images on a recording member from light provided by a light source;
   control meams disposed in a path through which light from the light source is transmitted to the recording member for controlling the amount of light transmitted therethrough or reflected therefrom;
   output means for providing an image signal to said control means; and
   detection means for detecting an image forming condition of said image forming means, wherein said control means provides an image light signal to said image forming means in response to the image signal and controls the amount of light transmitted therethrough in response to an output from said detection means so as to change the image forming condition of said image forming means to a predetermined condition;
   wherein said control means comprises a plurality of light transmission control elements and driving means for driving said elements and, wherein said light transmission control elements each include a liquid crystal.

9. Image processing apparatus according to claim 8, wherein said output means includes an image memory.

10. Image processing apparatus according to claim 8, wherein said driving means controls the amount of transmitted light by changing the amplitude of signals provided for driving said light transmission control elements.

11. Image processing apparatus according to claim 8, wherein said driving means controls the amount of transmitted light by changing the frequency of signals provided for driving said light transmission control elements.

12. Image processing apparatus according to claim 8, wherein said driving means controls the amount of transmitted light by changing the duty ratio of signals provided for driving said light transmission control elements.

13. Image processing apparatus according to claim 8, wherein said image forming means comprises a transfer-type image forming member, means for charging said image forming member to a predetermined potential and means for transferring an image formed by said image forming means to the recording member, said detection means being arranged to detected the surface potential of said image forming member.

14. Image processing apparatus: according to claim 8, wherein said output means provides a half-tone image signal to said control means and said control means controls the amount of transmitted or reflected light per unit time in response to the image signal provided by said output means so as to permit said image forming means to form a half-tone image.

15. Image processing apparatus according to claim 14, wherein said control means controls the amount of transmitted light by changing, in response to the image signal, the frequency of signals for driving said light transmission control elements.

16. Image processing apparatus according to claim 14, wherein said control means controls the amount of transmitted light by changing, in response to the image signal, the duty ratio of signals for driving said light transmission control elements.

* * * * *

UNITED STATES PATENT AND TRADEMARK OFFICE
CERTIFICATE OF CORRECTION

PATENT NO. : 4,697,910

DATED : October 6, 1987

INVENTOR(S) : YUKIO KASUYA

It is certified that error appears in the above-identified patent and that said Letters Patent is hereby corrected as shown below:

AT [54] IN THE TITLE

Change the title to read:

--IMAGE PROCESSING APPARATUS WITH MEANS FOR CONTROLLING THE AMOUNT OF LIGHT TRANSMITTED THERETHROUGH TO A RECORDING MEMBER--.

COLUMN 1

Line 22, "variation" should read --variations--.
    Line 23, "the change of" should read --changes in--.

COLUMN 2

Line 1, "transmit" should read --transmitted--.
    Line 44, "illustrating" should read --illustrate--.
    Line 56, "FIG. 26 shows" should read --FIG. 25 shows--.

COLUMN 3

Line 33, "FIG. 46" should read --FIG. 45--.

UNITED STATES PATENT AND TRADEMARK OFFICE
CERTIFICATE OF CORRECTION

PATENT NO. : 4,697,910

DATED : October 6, 1987

INVENTOR(S) : YUKIO KASUYA

It is certified that error appears in the above-identified patent and that said Letters Patent is hereby corrected as shown below:

COLUMN 4

Line 23, "transistor" should read --transistors--.

COLUMN 6

Line 19, "image" should read --image,--.
    Line 36, delete "up".
    Line 46, "RAM etc." should read --RAM, etc.--.

COLUMN 7

Lines 10-11, "approaching" should read --approach--.
    Line 11, "potengial," should read --potential,--.

COLUMN 8

Line 22, "abovedescribed" should read --above-described--.
    Line 35, "22" should read --21--.
    Line 56, "crystal waveform" should read --crystal drive waveform--.
    Line 62, "f, but)" should read --f), but--.
    Line 67, "of C.R." should read --of C·R.--.

UNITED STATES PATENT AND TRADEMARK OFFICE
CERTIFICATE OF CORRECTION

PATENT NO. : 4,697,910

DATED : October 6, 1987

INVENTOR(S) : YUKIO KASUYA

It is certified that error appears in the above-identified patent and that said Letters Patent is hereby corrected as shown below:

COLUMN 9

Line 3, "$\bar{f}X$" should read --fX--.
Line 11, "ANd-gate" should read --AND-gate--.
Line 32, "abovedescribed" should read --above-described--.

Line 34, "fY" should read --$\bar{f}Y$--.

Line 35, "f and f" should read --f and $\bar{f}$--.
Line 36, "C.R." should read --C·R.--.

COLUMN 10

Line 19, "potention" should read --potential--.

COLUMN 11

Line 13, delete "down".

UNITED STATES PATENT AND TRADEMARK OFFICE
CERTIFICATE OF CORRECTION

PATENT NO. : 4,697,910
DATED : October 6, 1987
INVENTOR(S) : YUKIO KASUYA

It is certified that error appears in the above-identified patent and that said Letters Patent is hereby corrected as shown below:

COLUMN 12

Line 4, delete "up".
    Line 7, delete "down".
    Line 33, "transfer" should read --transfers--.

COLUMN 13

Line 3, "always produce always" should read --always produce--.
    Line 56, "of" should read --of the--.

COLUMN 16

Line 32, "enables to provide" should read --provides--.
    Line 58, "two parts" should read --of two parts--.

COLUMN 17

Line 5, "carried" should read --is carried--.

UNITED STATES PATENT AND TRADEMARK OFFICE
CERTIFICATE OF CORRECTION

PATENT NO. : 4,697,910

DATED : October 6, 1987

INVENTOR(S) : YUKIO KASUYA

It is certified that error appears in the above-identified patent and that said Letters Patent is hereby corrected as shown below:

COLUMN 18

Line 31, "ae" should read --are--.

COLUMN 19

Line 14, "carried" should read --carried out--.
    Line 14, "the buffer memory" should read
        --of the buffer memories--.
    Line 19, delete "shutter".

COLUMN 20

Line 12, "Image processing" should read
        --Image processing apparatus--.
    Line 15, "meams" should read --means--.
    Line 58, "detected" should read --detect--.
    Line 60, "apparatus:" should read --apparatus--.

Signed and Sealed this

Nineteenth Day of April, 1988

Attest:

DONALD J. QUIGG

*Attesting Officer*      *Commissioner of Patents and Trademarks*